US012233562B2

(12) United States Patent
Mayberry et al.

(10) Patent No.: US 12,233,562 B2
(45) Date of Patent: Feb. 25, 2025

(54) FOLDING KNIFE

(71) Applicant: Magpul Industries Corp., Austin, TX (US)

(72) Inventors: Michael T. Mayberry, Denver, CO (US); Danny R. Smith, Westminster, CO (US); Thomas Ward, Tualatin, OR (US); Deniece Hopkins, Longmont, CO (US); Timothy Eric Roberts, Broomfield, CO (US); Timothy James Galyean, Yamhill, OR (US)

(73) Assignee: Magpul Industries Corp., Austin, TX (US)

( * ) Notice: Subject to any disclaimer, the term of this patent is extended or adjusted under 35 U.S.C. 154(b) by 0 days.

(21) Appl. No.: 17/340,661

(22) Filed: Jun. 7, 2021

(65) Prior Publication Data

US 2021/0331335 A1 Oct. 28, 2021

Related U.S. Application Data

(63) Continuation of application No. 16/897,494, filed on Jun. 10, 2020, now Pat. No. 11,052,551, which is a continuation-in-part of application No. 16/268,608, filed on Feb. 6, 2019, now Pat. No. 11,453,133.

(60) Provisional application No. 62/785,730, filed on Dec. 28, 2018, provisional application No. 62/781,518, filed on Dec. 18, 2018.

(51) Int. Cl.
*B26B 1/04* (2006.01)

(52) U.S. Cl.
CPC .............. *B26B 1/044* (2013.01); *B26B 1/048* (2013.01)

(58) Field of Classification Search
CPC ............ B26B 1/044; B26B 1/048; B26B 1/06
USPC ............ 30/161
See application file for complete search history.

(56) References Cited

U.S. PATENT DOCUMENTS 2,725,438 A 11/1955 Bentley
2,821,588 A 1/1958 Fisher
(Continued)

FOREIGN PATENT DOCUMENTS

CN 202318327 U * 7/2012 ............... B26B 1/10
CN 204248915 U * 4/2015 ............... B26B 1/02
(Continued)

OTHER PUBLICATIONS

Ayala, Fernando, "Final Office Action Regarding U.S. Appl. No. 16/268,608", Jan. 3, 2020, p. 19, Published in: US.
(Continued)

*Primary Examiner* — Evan H MacFarlane
*Assistant Examiner* — Fernando A Ayala
(74) *Attorney, Agent, or Firm* — Neugeboren O'Dowd PC

(57) ABSTRACT

This disclosure describes systems, methods, and apparatus for a locking folding knife having a handle lock and a safety switch arranged around and rotatable around a pivot axis of the knife. In an engaged position the switch overlaps at least a portion of the handle lock and prevents it from moving into an unlocked position. A spring, such as a wire form spring, can be arranged within a pocket of the switch, and when the switch is moved between engaged and disengaged positions the spring can be compressed generating a rotational bias on the switch urging the switch toward either the engaged or disengaged position.

20 Claims, 34 Drawing Sheets

(56) References Cited

U.S. PATENT DOCUMENTS

| | | | | | |
|---|---|---|---|---|---|
| 2,871,604 | A | * | 2/1959 | Norman | F41A 19/16 42/69.01 |
| 3,355,833 | A | | 12/1967 | Ruger et al. | |
| 3,457,383 | A | | 7/1969 | Roberts, Jr. et al. | |
| 3,703,245 | A | * | 11/1972 | Brewer | B60K 15/0406 220/302 |
| 3,748,730 | A | | 7/1973 | Bartram et al. | |
| 3,781,988 | A | | 1/1974 | Jones | |
| 4,011,741 | A | | 3/1977 | Nolin | |
| 4,160,511 | A | * | 7/1979 | Hukuta | B60K 15/0409 220/210 |
| 4,209,900 | A | * | 7/1980 | Gilbert | B26B 5/001 30/162 |
| 4,291,944 | A | * | 9/1981 | Nomura | G03B 17/14 359/827 |
| 4,693,228 | A | | 9/1987 | Simonds et al. | |
| 5,262,678 | A | | 11/1993 | Flowers et al. | |
| 5,596,808 | A | | 1/1997 | Lake et al. | |
| 5,728,997 | A | * | 3/1998 | Kim | H05B 6/68 219/720 |
| 5,802,722 | A | | 9/1998 | Maxey et al. | |
| 5,822,866 | A | | 10/1998 | Pardue | |
| 6,105,255 | A | | 8/2000 | Cheng | |
| 6,289,592 | B1 | | 9/2001 | Emerson | |
| 6,397,477 | B1 | | 6/2002 | Collins | |
| 6,427,335 | B1 | | 8/2002 | Ralph | |
| 6,434,831 | B2 | | 8/2002 | Chen | |
| 6,553,672 | B2 | | 4/2003 | Glesser et al. | |
| 6,651,344 | B2 | | 11/2003 | Cheng | |
| 6,668,460 | B2 | | 12/2003 | Feng | |
| 6,701,621 | B2 | | 3/2004 | Kain | |
| 6,810,588 | B1 | | 11/2004 | Cheng | |
| 6,834,432 | B1 | | 12/2004 | Taylor, Jr. | |
| 6,941,661 | B2 | | 9/2005 | Frazer | |
| 6,959,494 | B2 | | 11/2005 | Taylor | |
| 7,000,323 | B1 | | 2/2006 | Hatcher et al. | |
| 7,059,053 | B2 | | 6/2006 | Sakai | |
| 7,121,005 | B2 | | 10/2006 | Hughes | |
| 7,146,736 | B1 | | 12/2006 | Collins | |
| 7,165,329 | B2 | | 1/2007 | Kao | |
| 7,243,430 | B1 | | 7/2007 | Lerch | |
| 7,275,321 | B2 | | 10/2007 | Cheng | |
| 7,278,213 | B2 | | 10/2007 | Pardue et al. | |
| 7,302,760 | B2 | | 12/2007 | Lake | |
| 7,305,768 | B2 | | 12/2007 | Hinderer | |
| 7,313,866 | B2 | | 1/2008 | Linn et al. | |
| 7,370,421 | B2 | | 5/2008 | Onion et al. | |
| 7,437,822 | B2 | | 10/2008 | Flagg et al. | |
| 7,458,159 | B2 | | 12/2008 | Galyean et al. | |
| 7,513,044 | B2 | | 4/2009 | Lake | |
| 7,536,788 | B2 | | 5/2009 | VanHoy et al. | |
| 7,543,386 | B2 | * | 6/2009 | Sullivan | B26B 1/046 30/160 |
| 7,555,839 | B2 | | 7/2009 | Koelewyn | |
| 7,562,454 | B2 | | 7/2009 | Steigerwalt | |
| 7,603,778 | B1 | | 10/2009 | Lerch | |
| 7,676,931 | B2 | | 3/2010 | Knight et al. | |
| 7,676,932 | B2 | | 3/2010 | Grice et al. | |
| 7,748,122 | B2 | | 7/2010 | Duey | |
| 7,774,940 | B2 | | 8/2010 | Frank | |
| 7,854,067 | B2 | | 12/2010 | Lake | |
| 7,987,601 | B2 | | 8/2011 | Nakamura | |
| 8,001,693 | B2 | | 8/2011 | Onion | |
| RE42,906 | E | | 11/2011 | Onion | |
| 8,291,597 | B2 | | 10/2012 | Hawk et al. | |
| 8,307,555 | B2 | | 11/2012 | Onion | |
| 8,375,589 | B2 | | 2/2013 | Bremer | |
| 8,375,590 | B2 | | 2/2013 | Duey | |
| 8,490,288 | B1 | | 7/2013 | Mollick et al. | |
| 8,499,460 | B1 | | 8/2013 | Pearman | |
| 8,499,461 | B1 | | 8/2013 | Mollick et al. | |
| 8,572,851 | B2 | | 11/2013 | Duey | |
| 8,683,702 | B2 | | 1/2014 | Lo | |
| 8,813,366 | B2 | | 8/2014 | Chen | |
| 8,863,393 | B2 | | 10/2014 | Chen | |
| 8,863,394 | B2 | | 10/2014 | Lo | |
| 8,966,768 | B2 | | 3/2015 | Onion | |
| 9,120,234 | B2 | | 9/2015 | MacNair et al. | |
| 9,138,903 | B2 | | 9/2015 | Vellekamp | |
| 9,242,383 | B2 | | 1/2016 | Drai | |
| 9,302,399 | B2 | | 4/2016 | Kao | |
| 9,327,413 | B2 | | 5/2016 | Sakai | |
| 9,339,681 | B1 | * | 5/2016 | Nalley | A63B 21/063 |
| 9,346,176 | B2 | | 5/2016 | Collins et al. | |
| 9,352,473 | B2 | | 5/2016 | Harvey | |
| 9,364,957 | B2 | | 6/2016 | Lake | |
| 9,387,595 | B2 | | 7/2016 | Ikoma | |
| 9,505,141 | B2 | | 11/2016 | Duey | |
| 9,527,218 | B2 | | 12/2016 | Valdez | |
| 9,579,807 | B2 | | 2/2017 | Chu et al. | |
| 9,737,997 | B1 | | 8/2017 | Marfione et al. | |
| 9,878,455 | B1 | | 1/2018 | Perez | |
| 9,943,970 | B2 | | 4/2018 | Glesser | |
| 9,975,259 | B2 | | 5/2018 | Liu | |
| 10,035,272 | B2 | | 7/2018 | Bruhns | |
| 10,071,489 | B2 | | 9/2018 | MacNair et al. | |
| 2001/0052187 | A1 | | 12/2001 | Eickhorn | |
| 2004/0154170 | A1 | | 8/2004 | Kain et al. | |
| 2005/0183268 | A1 | | 8/2005 | Chen | |
| 2006/0064877 | A1 | | 3/2006 | Vallotton et al. | |
| 2006/0113444 | A1 | | 6/2006 | Parsons et al. | |
| 2006/0260137 | A1 | | 11/2006 | Flagg et al. | |
| 2006/0260138 | A1 | | 11/2006 | VanHoy | |
| 2007/0186420 | A1 | | 8/2007 | Koelewyn | |
| 2008/0066318 | A1 | | 3/2008 | Ye | |
| 2008/0172884 | A1 | | 7/2008 | Cheng | |
| 2009/0183374 | A1 | * | 7/2009 | Kao | B26B 1/044 30/159 |
| 2014/0047718 | A1 | * | 2/2014 | Fellows | B26B 1/02 30/161 |
| 2014/0360023 | A1 | * | 12/2014 | Lake | B26B 1/044 30/161 |
| 2016/0260138 | A1 | * | 9/2016 | Amit | G06Q 30/0276 |
| 2016/0368154 | A1 | * | 12/2016 | Varner | B26B 1/00 |
| 2017/0066144 | A1 | | 3/2017 | Ohlrich | |
| 2017/0066145 | A1 | | 3/2017 | Cheung | |
| 2017/0136634 | A1 | | 5/2017 | Kao | |
| 2017/0165849 | A1 | | 6/2017 | DeBaker | |
| 2017/0232622 | A1 | | 8/2017 | Bruhns | |
| 2017/0333069 | A1 | | 11/2017 | Vodinh | |
| 2018/0021963 | A1 | * | 1/2018 | Liao | B26B 1/044 30/161 |
| 2018/0065259 | A1 | | 3/2018 | Gibbs | |
| 2018/0133907 | A1 | * | 5/2018 | Kao | B26B 1/042 |
| 2018/0169875 | A1 | | 6/2018 | Valdez | |

FOREIGN PATENT DOCUMENTS

| | | | |
|---|---|---|---|
| DE | 202015103807 | U1 | 8/2015 |
| WO | 2014130333 | A1 | 8/2014 |

OTHER PUBLICATIONS

Ayala, Fernando A., "Office Action Regarding U.S. Appl. No. 16/268,608", Apr. 9, 2019, p. 14, Published in: US.

Ayala, Fernando, "Office Action Regarding U.S. Appl. No. 16/268,608", Jul. 23, 2020, p. 42, Published in: US.

Gruber, Stephen, "Reponse to Office Action Regarding U.S. Appl. No. 16/268,608", Feb. 26, 2020, p. 9, Published in: US.

Gruber, Stephen, "Response to Office Action Regarding U.S. Appl. No. 16/268,608", Aug. 2, 2019, p. 28, Published in: US.

Ayala, Fernando, "Office Action Regarding U.S. Appl. No. 16/897,494", Nov. 17, 2020, p. 52, Published in: US.

Gruber, Stephen S., "Response to Office Action Regarding U.S. Appl. No. 16/897,494", Feb. 17, 2021, p. 12, Published in: US.

Connelley, Larry, "Benchmade Axis Lock—Knife Lock Mechanism Explained", Retrieved from https://www.knifeart.com/benchmade-axis-lock.html, 2016, p. 2, Published in: US.

Ontario Knife, "Product Detail: Carter Knife", Known to exist as early as Dec. 4, 2018, p. 1, Publisher: https://web.archive.org/web/20181018084603/http://ontarioknife.com/carter-prime.html.

(56) References Cited

OTHER PUBLICATIONS

Carl Kammerling International Ltd., "Folding Utility Knife", Known to exist as early as Dec. 4, 2018, p. 1, Retrieved from http://www.ck-tools.com/products/ck_tools/sawing_cutting/trimming_knives/folding_utility_knife/.
Coast Products, Inc., "DX311", Known to exist as early as Dec. 4, 2018, p. 2, Publisher: Retrieved from https://coastportland.com/product/dx311/.
Columbia River Knife and Tool, "Homefront", Known to exist as early as Dec. 4, 2018, p. 3, Publisher: Retrieved from https://www.crkt.com/homefront.html, Published in: US.
CRKT Official, "CRKT Lawks—Lake and Walker Knife Safety System—How to Use", Jul. 22, 2009, p. 2, Publisher: Retrieved from https://www.youtube.com/watch?v=1sfm3TWB1hQ.
SOG Specialty Knives & Tools, LLC, "Flash II Black Serrated", Known to exist as early as Dec. 4, 2018, p. 5, Publisher: Retrieved from https://www.sogknives.com/type/knives/flash-ii-partially-serrated-black-tini-clam-pack.html.
SOG Specialty Knives & Tools, LLC, "Kiku Assisted Satin", Known to exist as early as Dec. 4, 2018, p. 4, Publisher: Retrieved from https://www.sogknives.com/type/knives/kiku-assisted-satin.html.
Moon, Will, "The First Moon MK12 Heading Out!", Retrieved from http://willmooncustomknives.blogspot.com/2012/12/the-first-moon-mk12-heading-out.html, Dec. 4, 2012, p. 1, Published in: US.

* cited by examiner

FOLDING KNIFE

CLAIM OF PRIORITY UNDER 35 U.S.C. § 119

The present Application for Patent is a Continuation of U.S. patent application Ser. No. 16/897,494 entitled, "FOLDING KNIFE" filed Jun. 10, 2020, now issued as U.S. Pat. No. 11,052,551, which is a Continuation-in-Part of U.S. patent application Ser. No. 16/268,608 entitled, "FOLDING KNIFE" filed Feb. 6, 2019, which claims priority to Provisional Application No. 62/781,518 entitled "FOLDING KNIFE" filed Dec. 18, 2018 and also claims priority to Provisional Application No. 62/785,730 entitled "FOLDING KNIFE" filed Dec. 28, 2018, all of which are assigned to the assignee hereof and hereby expressly incorporated by reference herein.

FIELD OF THE DISCLOSURE

The present disclosure relates generally to folding knives. In particular, but not by way of limitation, the present disclosure relates to systems, methods and apparatuses for locking features of folding knives.

DESCRIPTION OF RELATED ART

Folding knives have been used for centuries by craftsmen, hunters, and others requiring a sharp cutting instrument. In an open or extended position, the knife cutting blade is extended to expose the blade cutting edge and permit cutting therein. In a closed position, the cutting edge of the blade is stored within a cavity or recess in the handle portion of the knife, thus preventing the blade from being exposed and acting as its own sheath. The folding knife further provides a cutting instrument which is much shorter in length than a typical fixed blade knife.

Although these types of knives are extremely convenient, they can potentially become dangerous if the cutting blade does not have a locking mechanism to securely keep the knife blade in the first extended position of use. Two popular types of such locks include the lock back and the liner lock. The lock back structure provides a spring-biased lever mounted along one side of a handle. The lever has a front hook or tooth that engages in a notch in the tang portion of the blade, adjacent to the point of pivotal attachment of the blade to the handle. The liner lock structure provides a thin liner of sheet metal that springs into place behind a flat portion of the tang of the blade, thereby preventing closure until the liner is manually moved out of the way of the blade.

Despite the popularity of these structures, there still are instances of lock failure or, more often, inadvertent releasing of the lock. Another problem is a lock which requires or encourages the user to have a finger or part of his or her hand in the path of a closing blade when the release mechanism is actuated, because of the arrangement of the parts and the actions necessary for releasing the lock.

U.S. Pat. No. 7,437,822 to Flagg discloses a liner lock with a spring-biased rotating safety mechanism, where the spring is arranged in a separate recess in the handle than the safety mechanism and is outside of the safety mechanism. Further, the spring only biases the safety mechanism toward the safe position such that the safety mechanism cannot remain in the release position unless the user physically holds the safety mechanism in the release position. Additionally, the spring force is greatest when the safety mechanism is in the release position. This patent is incorporated by reference herein in its entirety. U.S. Pat. No. 6,751,868 to Glesser discloses a folding knife with a substantially spherical locking mechanism, and is incorporated by reference herein in its entirety. U.S. Pat. No. 9,120,234 to Kai discloses a folding knife with a lockbar separate from the frame/handle, and is incorporated by reference herein in its entirety. U.S. Pat. No. 8,161,653 to Nenadic discloses a rotatable locking mechanism, and is incorporated by reference herein in its entirety. U.S. Pat. No. 9,862,105 to Liang discloses a handle lock with a safety that traverses the handle linearly parallel to a direction of the blade when extended, and is incorporated by reference herein in its entirety. U.S. Pat. No. 9,943,970 to Glesser discloses a rotatable locking wedge, and is incorporated by reference herein in its entirety. U.S. Pat. No. 10,654,180 to Onion discloses a rotatable switch on an opposing side of a knife frame from a frame lock that locks a pivot axis but does not interact with the frame lock, and is incorporated by reference herein in its entirety. U.S. Pat. No. 10,071,489 to MacNair discloses a lockbar having a puck for engagement with the blade's tang, and is incorporated by reference herein in its entirety.

It is well known that certain metals and other materials experience greater dynamic friction when surface movement between two objects occurs. In the case of a handle lock on a folding knife, the handle and thus the handle lock is often formed from aluminum or titanium, metals that feel "sticky" when moved across the tang of a steel blade. Thus, there is a need for a folding knife handle lock that is less "sticky" but still formed from common metals.

SUMMARY OF THE DISCLOSURE

This disclosure describes systems, methods, and apparatus for a locking folding knife having a handle lock and a safety switch arranged around and rotatable around a pivot axis of the knife. In an engaged position the switch overlaps at least a portion of the handle lock and prevents it from moving into an unlocked position. A spring, such as a wire form spring, can be arranged within a pocket of the switch, and when the switch is moved between engaged and disengaged positions the spring can be compressed generating a rotational bias on the switch urging the switch toward either the engaged or disengaged position. The spring can include a first and second end, where the first end can rest within and rotate within a curved pocket in a protrusion of the handle while the second end can rest within a sub-pocket of the pocket of the switch.

Some embodiments of the disclosure may be characterized as a locking folding knife comprising a handle, pivot axis, blade, locking mechanism, and a switch. The blade can have a cutting edge and a tang and the blade can be pivotably coupled to the handle such that the blade is pivotable relative to the handle about the pivot axis between a retracted position and an extended position. The cutting edge can be exposed in the extended position and a portion of the blade can be received within the handle in the retracted position. The locking mechanism can include a handle lock in the handle, or a liner, and can be biased to a locked position contacting the tang of the blade when the blade is in the extended position for preventing the blade from closing when in the extended position. The switch can be located in a first recess in the handle surrounding the pivot axis and the switch can be operable to pivot about the pivot axis between an engaged and a disengaged position. When the switch is pivoted to the engaged position it can block movement of the handle lock into the unlocked position. When the switch is pivoted to the disengaged position, the handle lock may be free to move into the unlocked position.

Other embodiments of the disclosure may also be characterized as a locking folding knife including a frame and a rotatable switch. The frame can have a first side and a second side, and optionally a liner, and the first side can be split into a fixed portion and a handle lock that flexes between a locked and an unlocked position. The handle lock can be biased to the locked position. The rotatable switch can be mounted to the frame and can be rotatable around a pivot axis of the lockable folding knife. The rotatable switch can have an engaged and a disengaged position, wherein in the engaged position the rotatable switch is at least partially arranged over the handle lock thereby preventing the handle lock from moving to its unlocked position. Also, in the disengaged position the rotatable switch can be misaligned with all portions of the handle lock thereby allowing the handle lock to be moved between its locked and unlocked positions.

Other embodiments of the disclosure can be characterized as a method of manufacturing a lockable folding knife. The method can include forming a blade, forming a frame, forming a slit in a first side of the frame, rotatably affixing the blade to the frame at a pivot axis of the lockable folding knife, forming a rotatable switch, and mounting the rotatable switch to the frame. The slit in the first side of the frame can split the first side into a non-movable portion and a flexible portion that is movable between a locked and an unlocked position and is biased toward the locked position. The mounting of the rotatable switch can include mounting the rotatable switching in a rotating manner at the pivot axis. The rotatable switch can include an engaged and a disengaged position, wherein in the engaged position the rotatable switch is arranged over at least a portion of the flexible portion thereby preventing the flexible portion from moving to its unlocked position, and wherein in the disengaged position the rotatable switch is not arranged over any of the flexible portion. As a result the handle lock can be moved between its locked and its unlocked positions when the switch is in the disengaged position.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The present disclosure relates generally to a folding knife. More specifically, but without limitation, the present disclosure relates to safety features for preventing a folding knife from inadvertently folding.

Various types of folding knives have been in use for many years due to the convenience and safety of being able to conceal the point and blade of a knife when it is not in use. A primary safety feature of folding knives has also existed for many years—namely, a mechanism to prevent the knife from inadvertently folding while in use. Folding knives, in contrast to fixed-blade knives such as kitchen knives, are often used in situations where they are transported, unfolded, and then used to cut or stab something. Such uses are common, for example, during hunting, camping, fishing, repairing or self-defense activities. In these use cases, there are a variety of circumstances that could cause the lock mechanism to fail or inadvertently unlock, thereby endangering the user.

Existing mechanisms for preventing knives from folding, such as springs, latches, and locks, can still sometimes be accidentally disengaged, or can wear down over time to the point that they become ineffective. The present disclosure provides a plurality of advantageous safety mechanisms. These mechanisms provide enhanced safety through the durability and tactile feel of the mechanisms themselves and the redundancy of mechanisms. The durability and tactile feel of the mechanisms may prevent wear in the first place and allow the user to easily feel when a safety feature is in its desired position. The redundancy of mechanisms may ensure that even in the event of a failure of one safety feature due to wear or breakage, another secondary safety feature may prevent an unsafe closure of the blade.

Figure 7A:
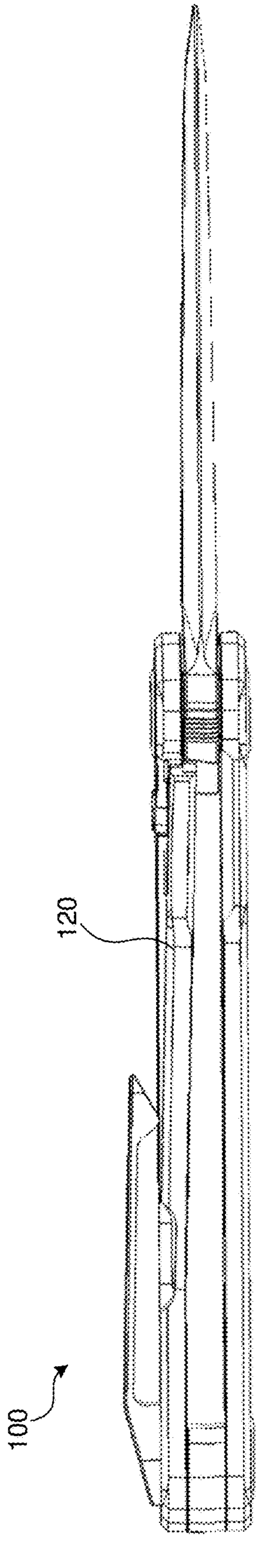
FIG. 7*a* shows a bottom view of the folding knife of FIG. 1.
Figure 7B:
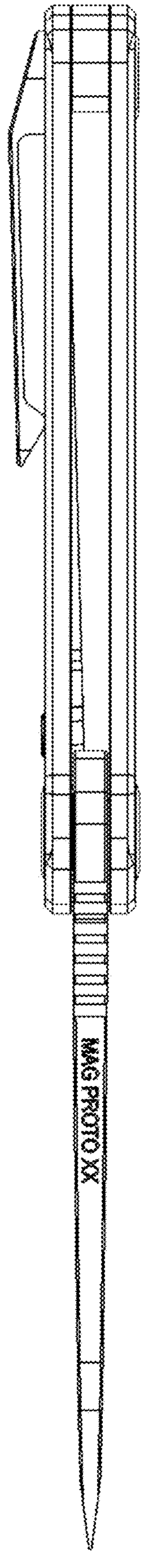
FIG. 7*b* shows a top view of the folding knife of FIG. 1.
Figure 8B:
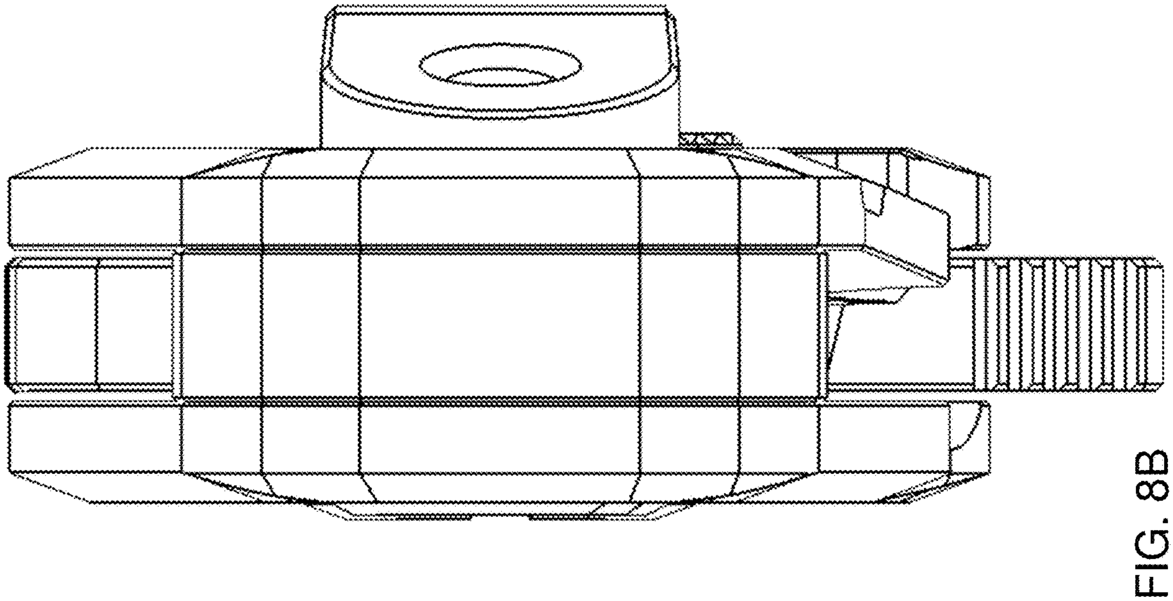
FIG. 8*b* shows a rear elevation view of the folding knife of FIG. 1.
Figure 8A:
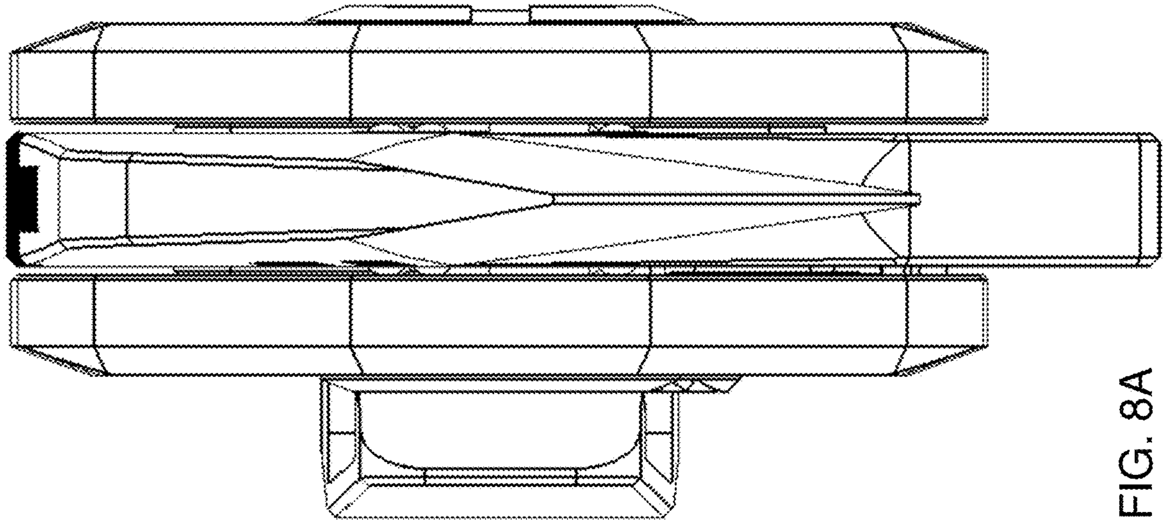
FIG. 8*a* shows a front elevation view of the folding knife of FIG. 1.
Figure 9:
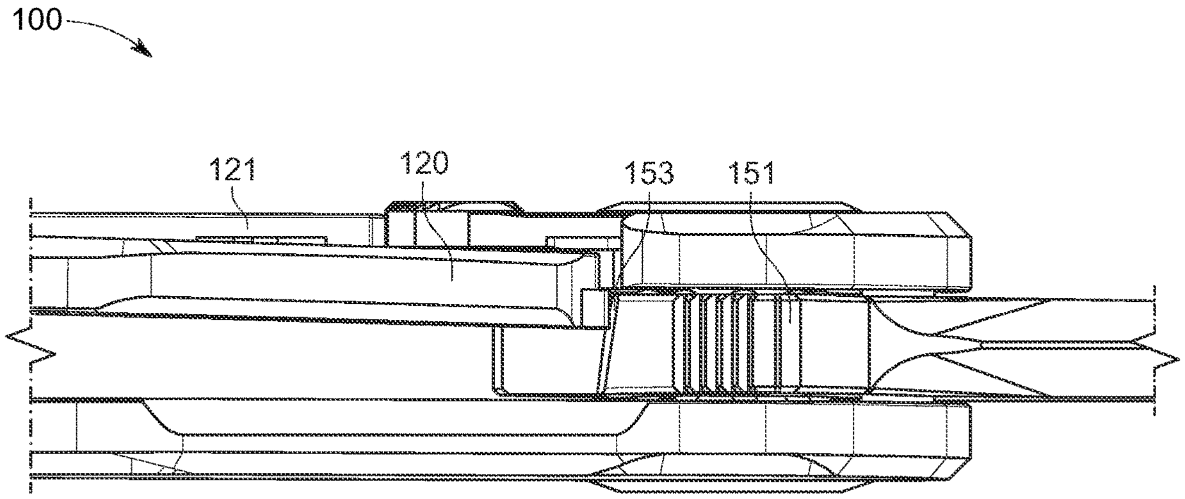
FIG. 9 shows a close-up view of a handle lock of the folding knife of FIG. 1 in an engaged position according to the present disclosure.

The herein disclosed embodiments include a first safety feature referred to herein as a "handle lock." The handle lock may be formed as part of the handle, from the shape of the handle itself providing the ability for the handle lock to flex relative to the rest of the handle. The handle lock (also referred to as a "handle lock portion," "lock bar," or "flexible portion") can be biased toward an opposing side of the folding knife such that when the blade is rotated out to an open or unfolded position, the handle lock moves toward an opposing handle and locks the blade in the unfolded position. The handle lock feature is best seen in FIGS. 7 and 9. FIG. 7A shows a bottom view of a folding knife 100 of the present disclosure with the blade fully extended and engaged. This position of the blade may be referred to throughout the disclosure as "unfolded" "extended," "engaged," or "locked," given that this full extension causes the handle lock 120 to engage the blade tang such that it is locked in the extended position. FIG. 9 shows a close-up view of the bottom of the knife 100 in its extended position. The handle lock portion 120 is shown engaged with a back end 153 of the blade tang 151.

The mechanism by which the handle lock engages with the blade tang can be the bias of the material from which the handle lock portion is formed. That is, its very shape may create the tension that pulls the handle lock portion into its natural position when the blade is extended. To disengage the handle lock portion, a user must apply pressure against the bias (away from the center of the handle toward the exterior of the handle) with the thumb of one hand and purposely move the blade with the other hand. The combination of these intentional motions by the user causes the handle lock portion 120 to move out of its locked position and allows the blade to rotate toward the closed position. When the blade tang is in its fully folded position, as best seen in FIGS. 16-20, the handle lock portion 120 is flush with the rest of the handle because the physical volume of the blade 150 pushes the handle lock portion out, against its natural bias and into the same plane as the non-movable portion 121 of the handle.

Figure 10:
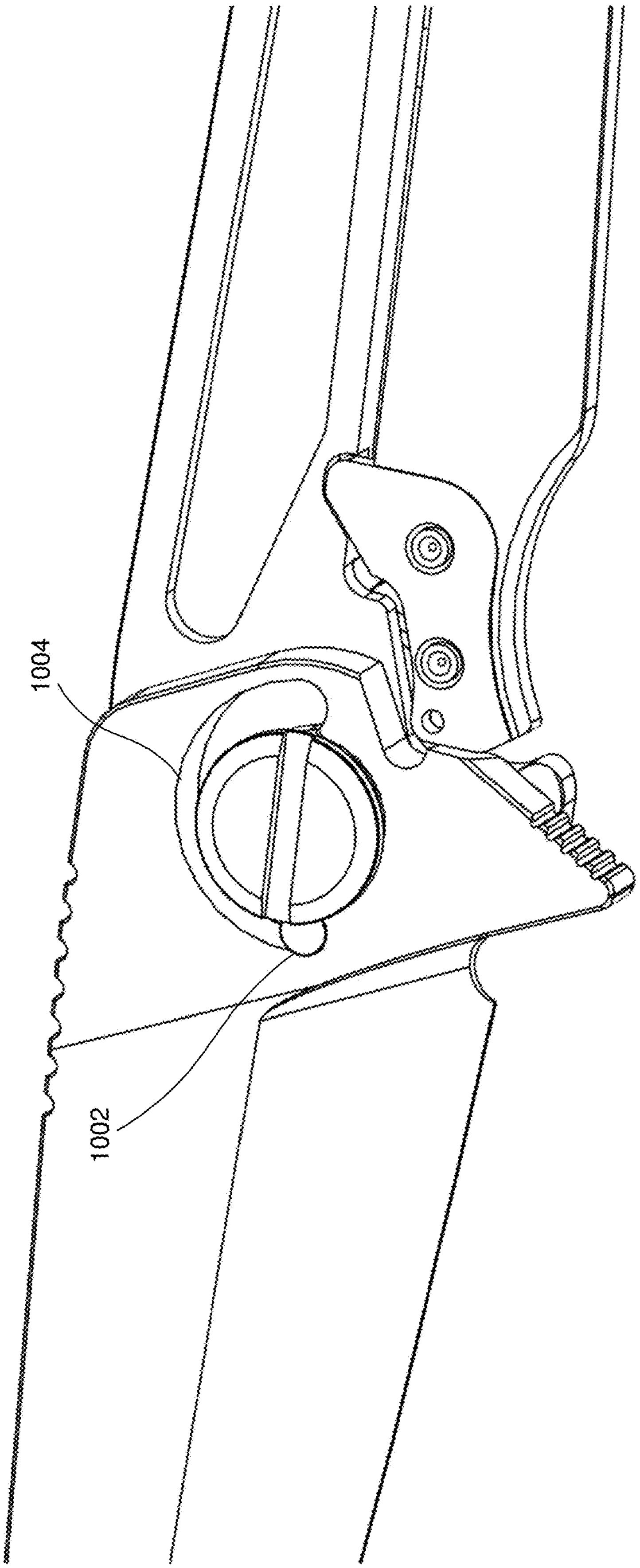
FIG. 10 shows the folding knife with a part of the handle hidden to reveal an embodiment of the interaction of a handle lock and tang of the blade as well as to show an embodiment of a reinforcement member.
Figure 15:
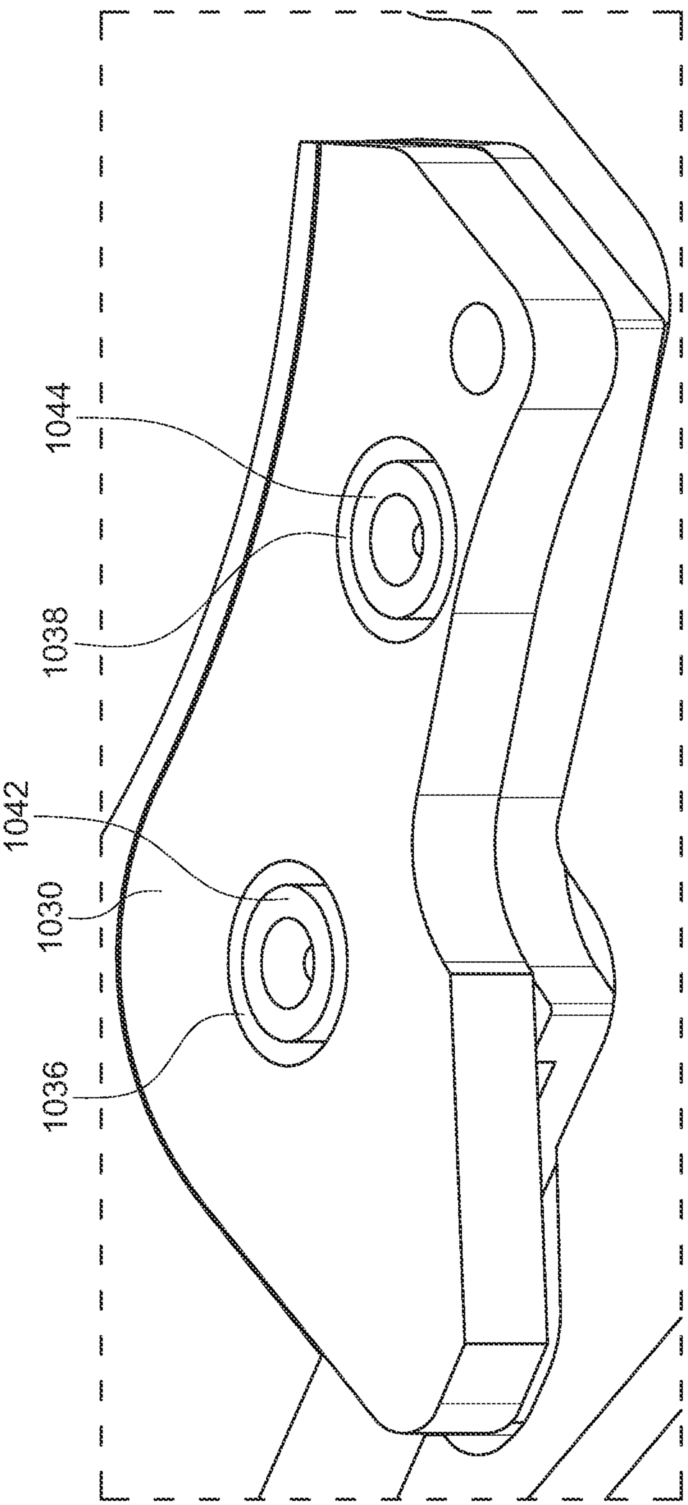
FIG. 15 shows a close-up view of the reinforcement mechanism of FIG. 10 having apertures and two posts of the handle lock engaged therewith.
Figure 16:
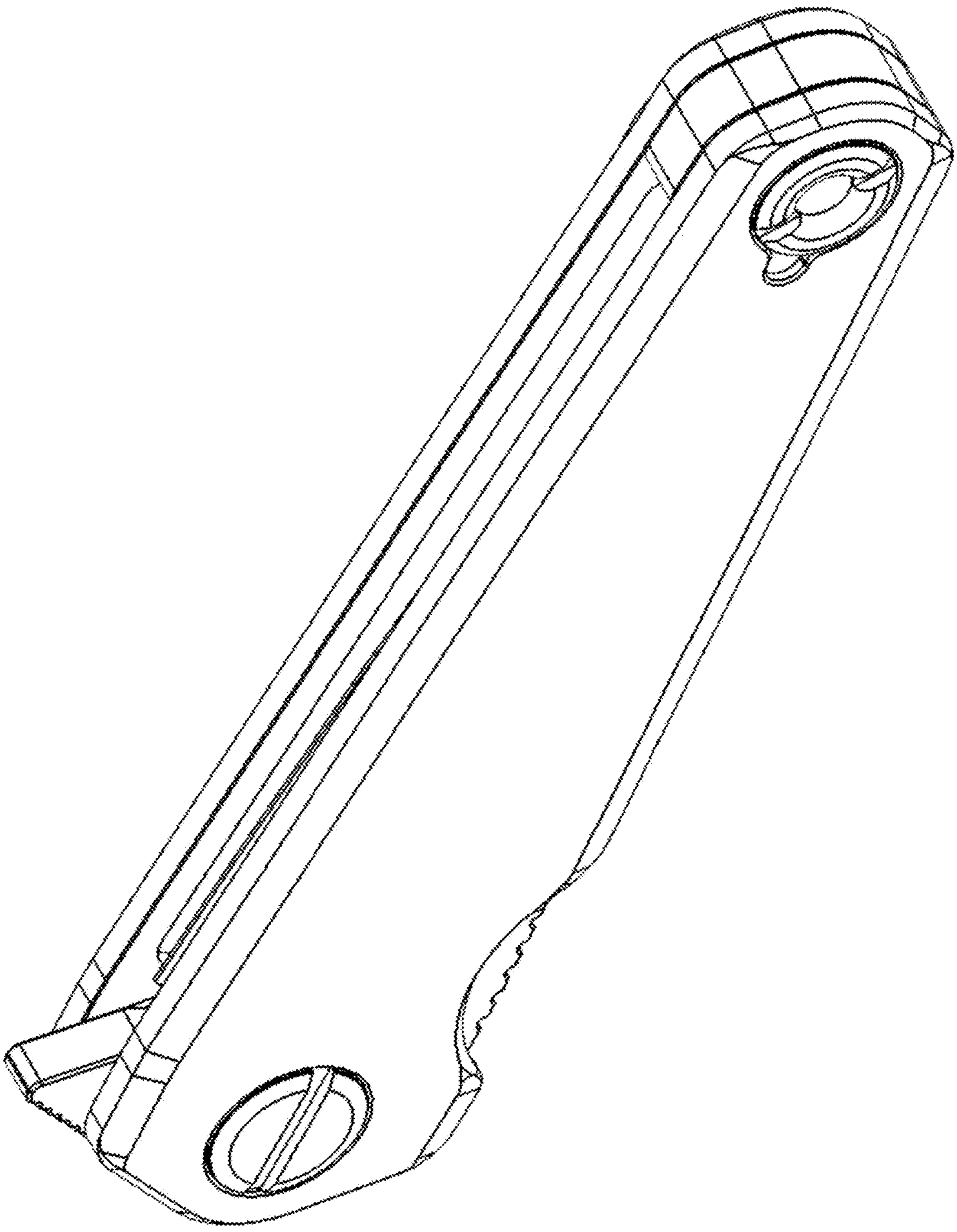
FIG. 16 shows a back top right view of the folding knife of FIG. 1 with the blade in the retracted position.
Figure 17:
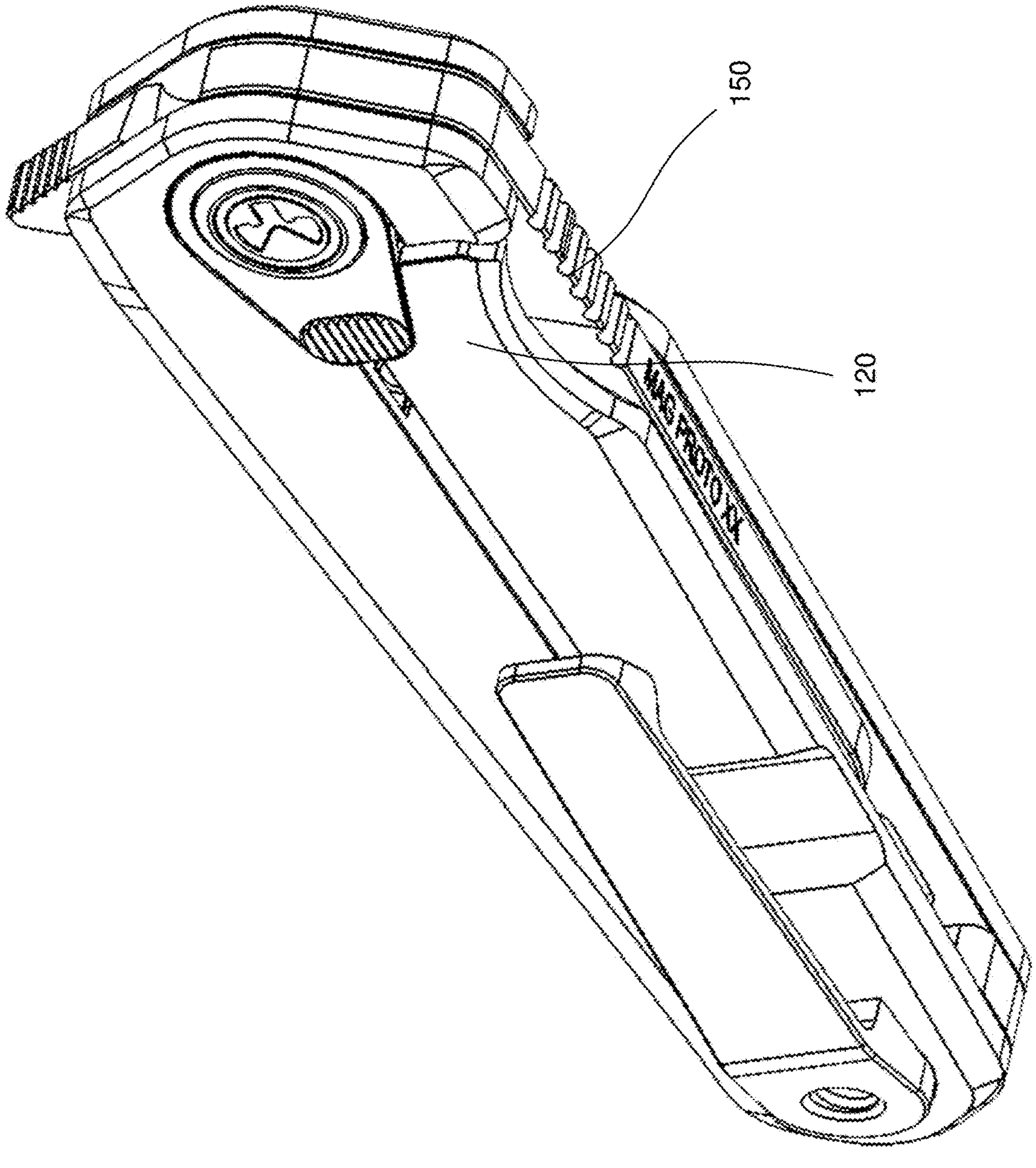
FIG. 17 shows a front bottom left perspective view of the folding knife of FIG. 1 with the safety toggle switch in a disengaged position.

The handle lock can include another safety feature referred to herein as a "reinforcement portion," which is best shown in the embodiment shown in FIGS. 10 and 15. This reinforcement portion 1030 adds strength to the handle lock portion and can be formed in manufacturing with one or more apertures through which a boss of the handle lock can pass. As shown in FIG. 15, each of the bosses 1042, 1044 (two are shown, but more or fewer than two can be implemented) can be deformed (or swaged) during assembly to lock the reinforcement portion to the handle lock portion. During assembly, the bosses can first start out as cylindrical, and then once the bosses have passed through the apertures 1036, 1038, the top may be deformed (or swaged) and somewhat flattened to fill a top space of the apertures such that the top deformed portion of the bosses holds the reinforcement portion to the handle lock portion and prevents the reinforcement portion's removal. The reinforcement member can be formed from a harder material than the handle, and can be shaped to interface with a somewhat vertical surface on the blade tang, thereby preventing closing of the blade when the blade is in the open position. This reinforcement member can also add durability to the handle lock feature to prevent wear. The reinforcement member can also be made from a different material, or be coated with a different material, than the rest of the handle lock, where this material has a lower coefficient of friction relative to the blade tang.

Figure 11:
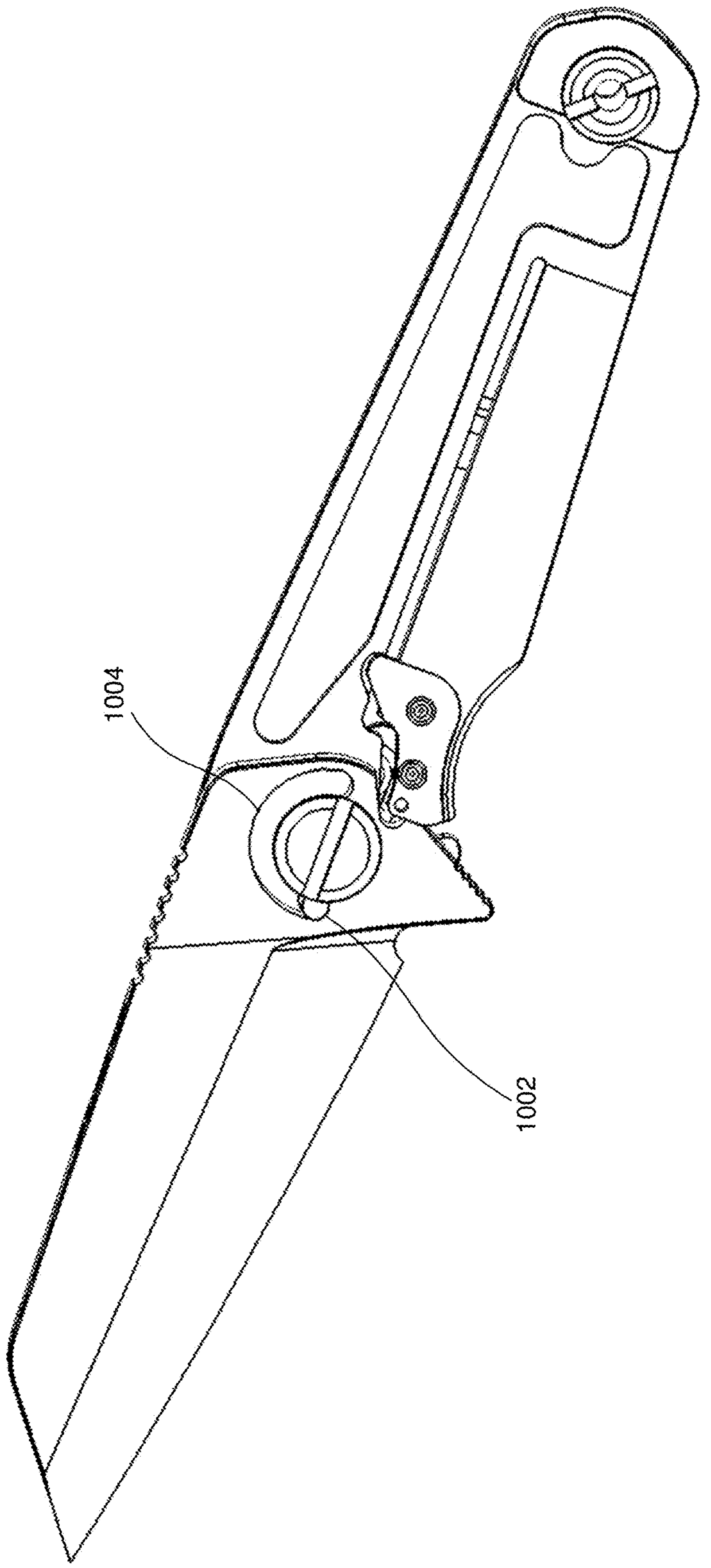
FIG. 11 shows another view of the folding knife of FIG. 10 with a part of the handle hidden.
Figure 13:
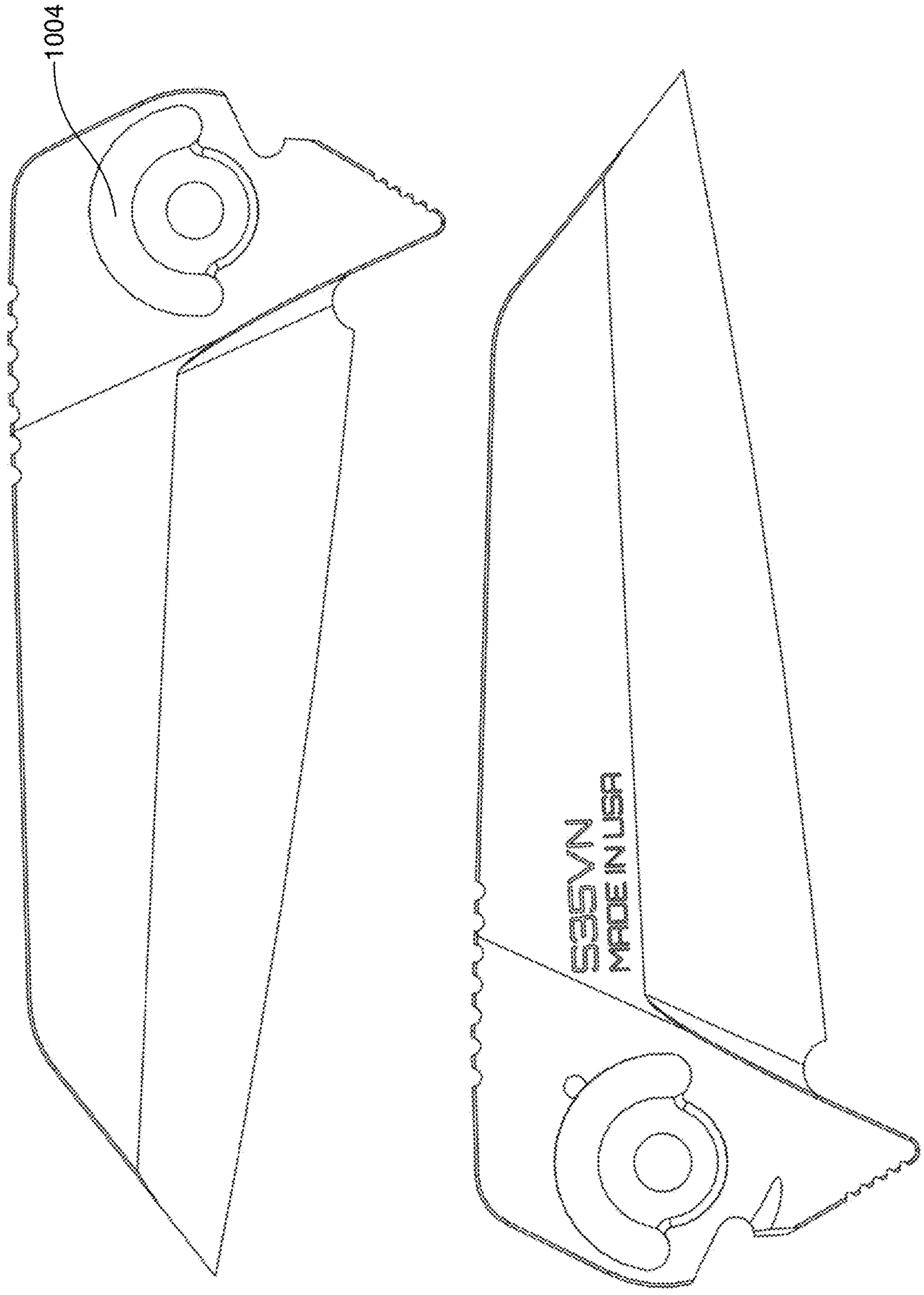
FIG. 13 shows a first and second side view of the blade of FIG. 10.
Figure 14:
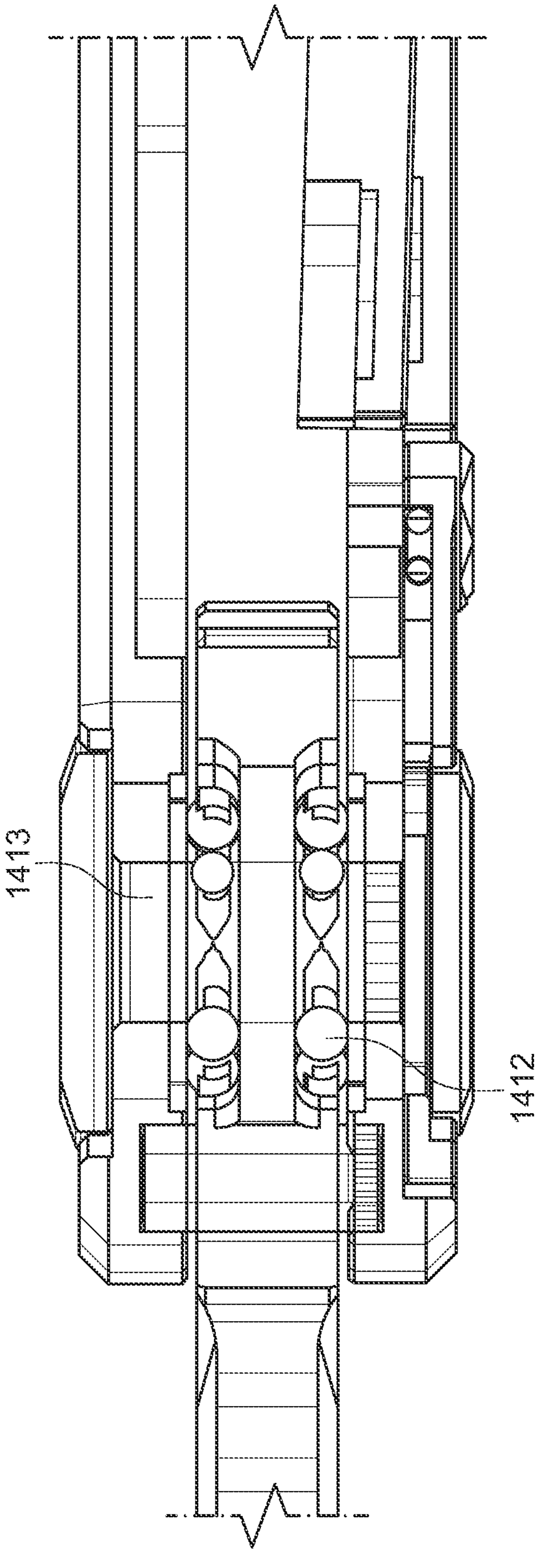
FIG. 14 shows a cross-sectional view from the top of the folding knife depicting the rotation mechanism of the blade.

FIG. 14 shows an embodiment of a cross-sectional view from the bottom of the knife depicting the rotating mechanism of the blade that allows it to move between its extended and folded positions. One or more ball bearings 1412 can provide a low-friction interface between the blade and the handle so that the blade can be rotationally guided via a blade stop (such as blade stop 102 in FIGS. 10 and 11) riding within a semicircular cutout 1004 in the blade (such as blade 104 in FIG. 13). The blade can pivot around a pivot mechanism 1413.

Figure 1:
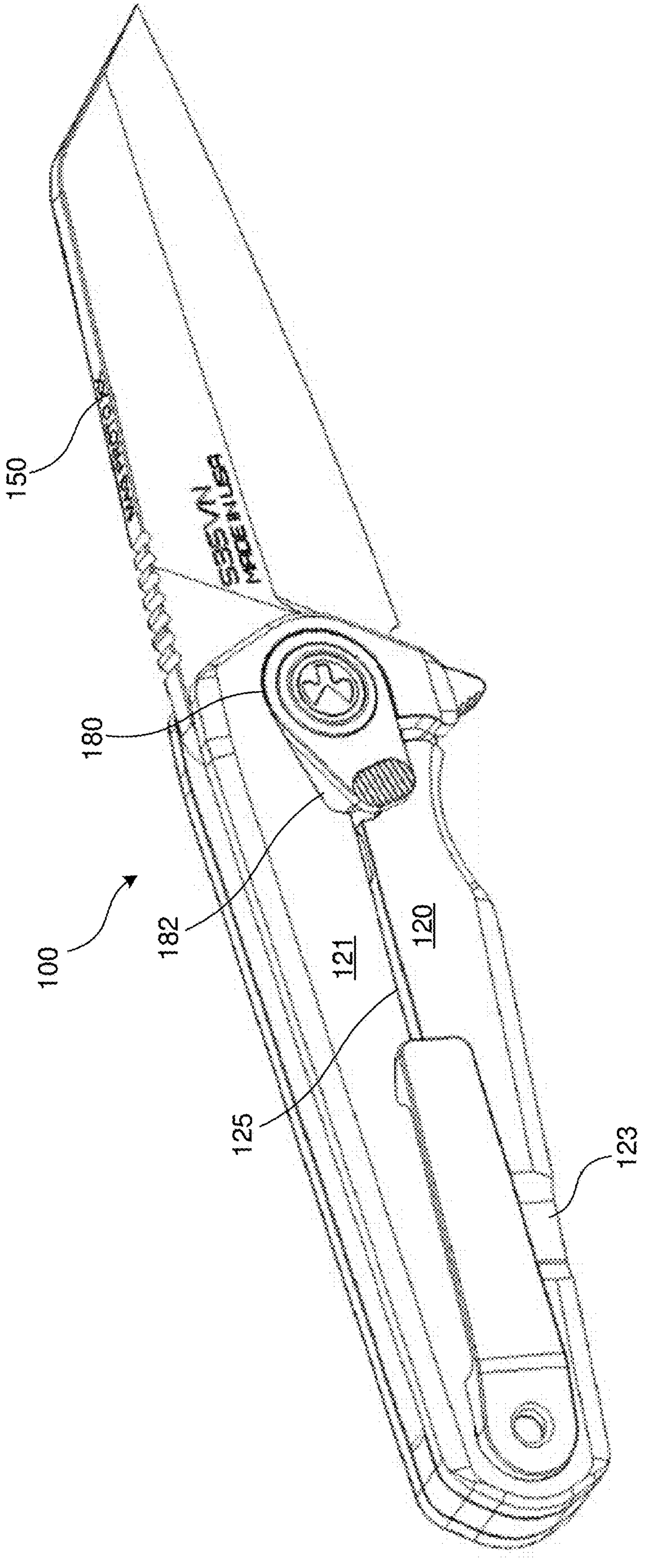
FIG. 1 is a perspective rear top left view of a folding knife according to the present disclosure.
Figure 2:
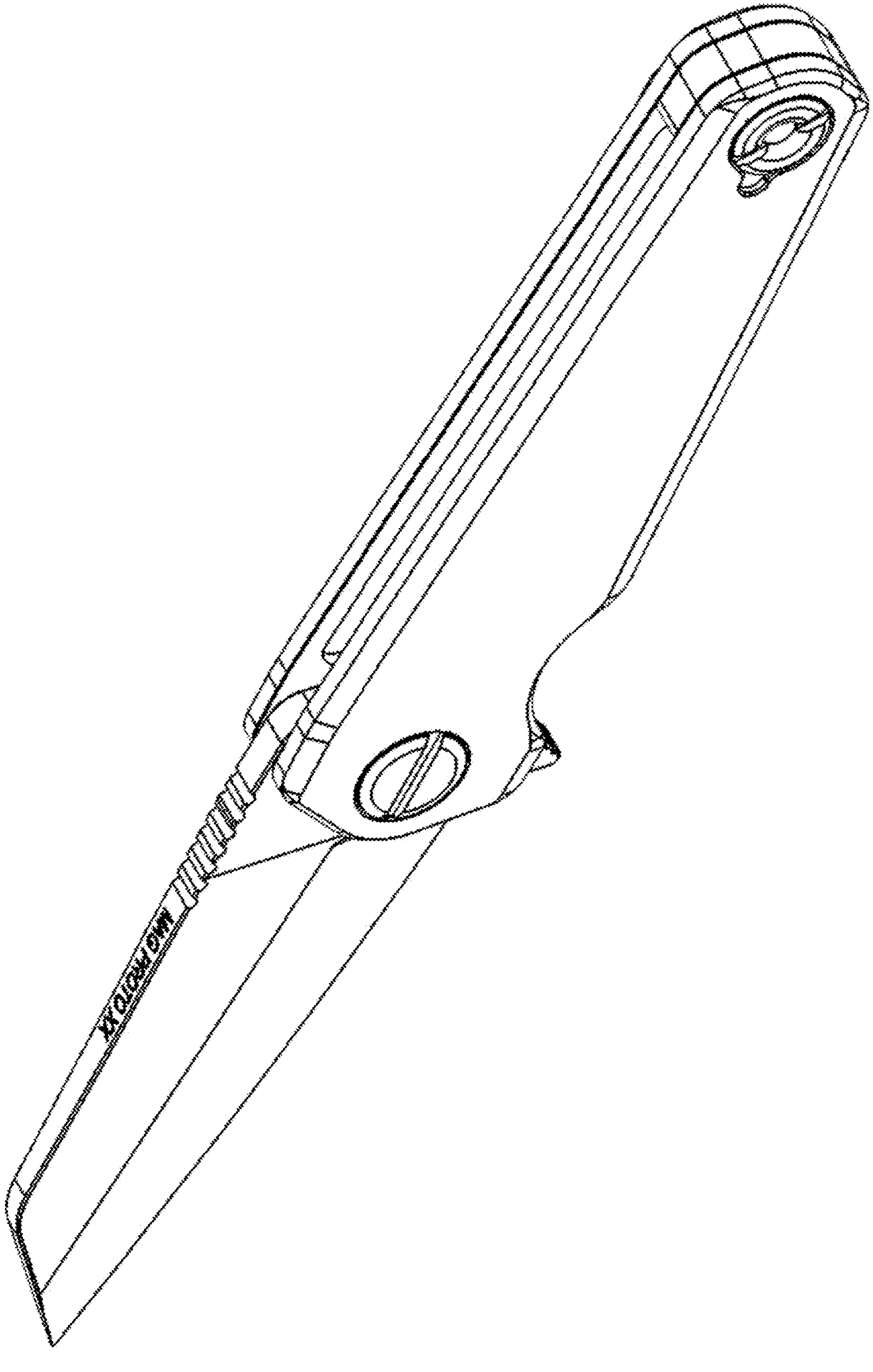
FIG. 2 is a perspective rear top right view of the folding knife of FIG. 1.
Figure 3:
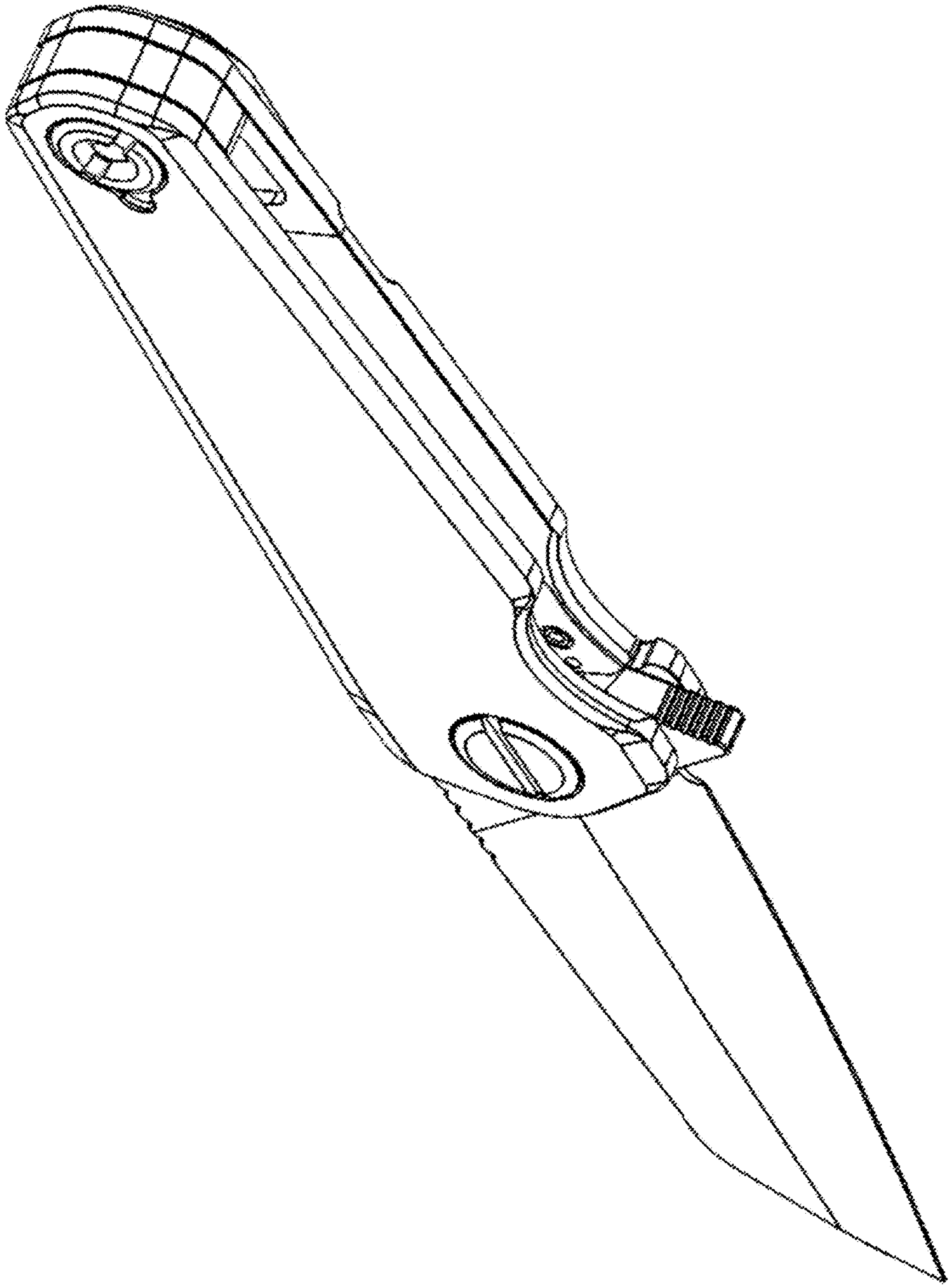
FIG. 3 is a perspective rear bottom right view of the folding knife of FIG. 1.
Figure 4:
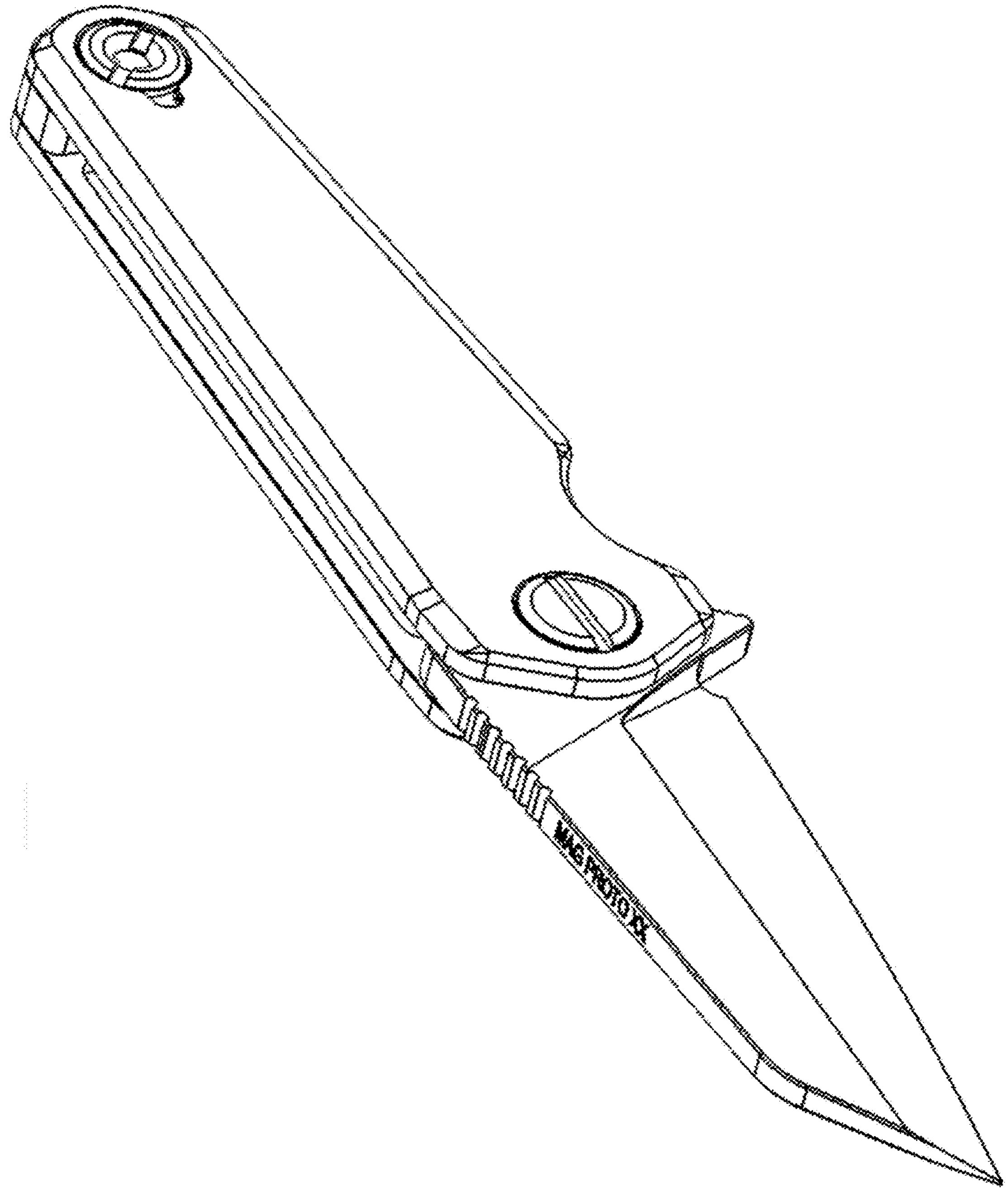
FIG. 4 is a perspective front top right view of the folding knife of FIG. 1.
Figure 5:
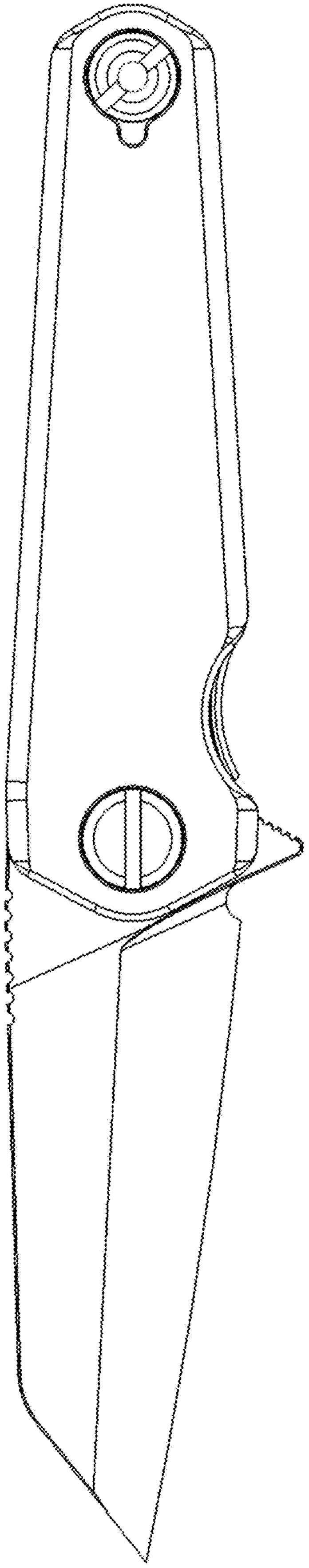
FIG. 5 is a right side elevation view of the folding knife of FIG. 1.
Figure 6:
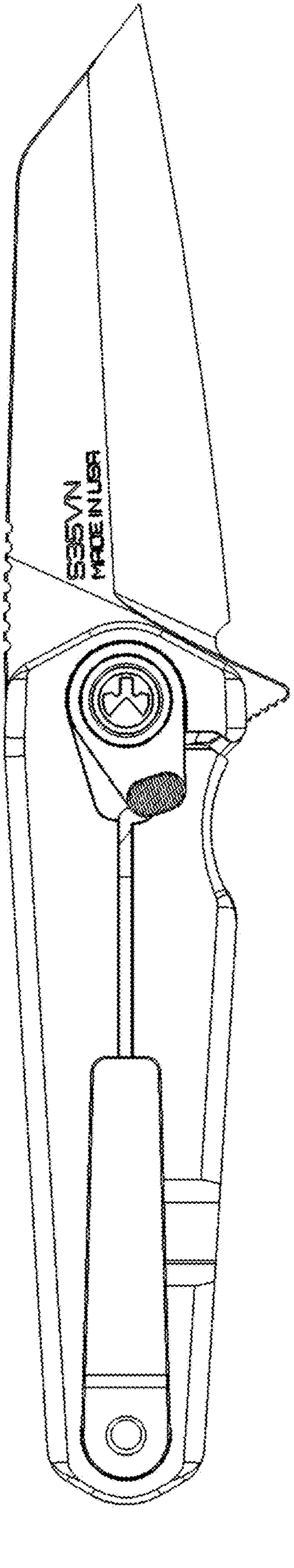
FIG. 6 is a left side elevation view of the folding knife of FIG. 1.
Figure 12:
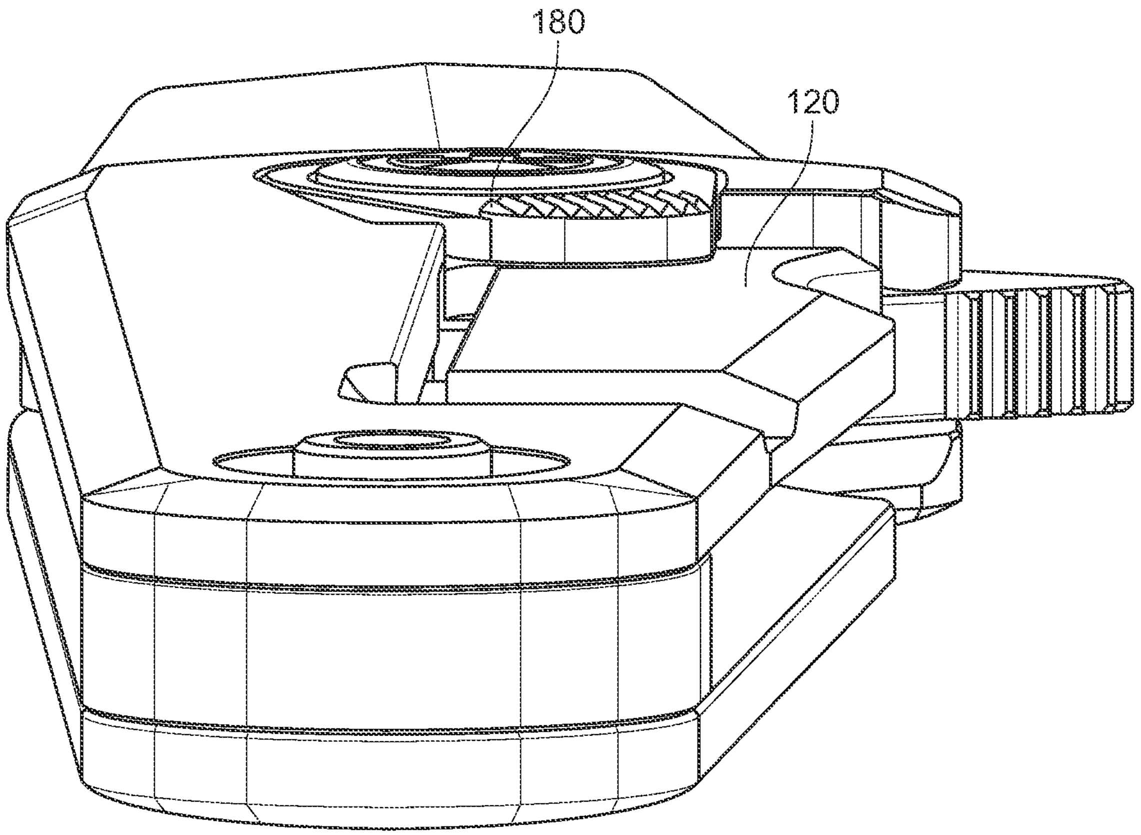
FIG. 12 shows a perspective view from the back of the folding knife of FIG. 1 depicting a handle lock portion in an engaged position and a safety toggle switch of the present disclosure in an engaged position.

The folding knife can also include another safety feature referred to herein as a "safety toggle switch" (or simply, "switch") configured to reside in either an engaged (i.e., "safe") or disengaged position, and can be rotationally biased throughout its range of movement—either toward the engaged or disengaged position depending on the switch's position. The rotational bias can force the switch to securely rest in the safe or unsafe position rather than to rest in between. The safety toggle switch is best shown in its safe or engaged position in FIGS. 1, 6, and 12. As shown in each of FIG. 1, when the blade 150 of the knife 100 is in its fully extended position and the handle lock portion 120 (or flexible portion) is engaged with a tang of the blade, the safety toggle switch 180, which can rotate within a switch cutout recess 182 (e.g., by around 15° or around 30° or around 45°), is situated in an engaged position within the switch cutout recess 182. The handle lock portion 120 can be unitary with a non-movable portion 121 and separated therefrom by a slit 125, where the handle lock portion 120 can include a hollow 123 that enhances its ability to flex relative to the non-movable portion 121. As shown in FIG. 12, in this engaged position, the switch 180 is positioned over at least a portion of the handle lock portion 120, preventing the handle lock portion 120 from being moved out of its locked position. This safety toggle switch 180 therefore prevents any accidental disengagement of the handle lock 120 that may occur if upward pressure were to be inadvertently applied against the bias of the handle lock 120. Further, the safety toggle switch 180 prevents the handle lock 120 from moving if the bias tension is diminished from wear or metal fatigue over time.

Figure 18:
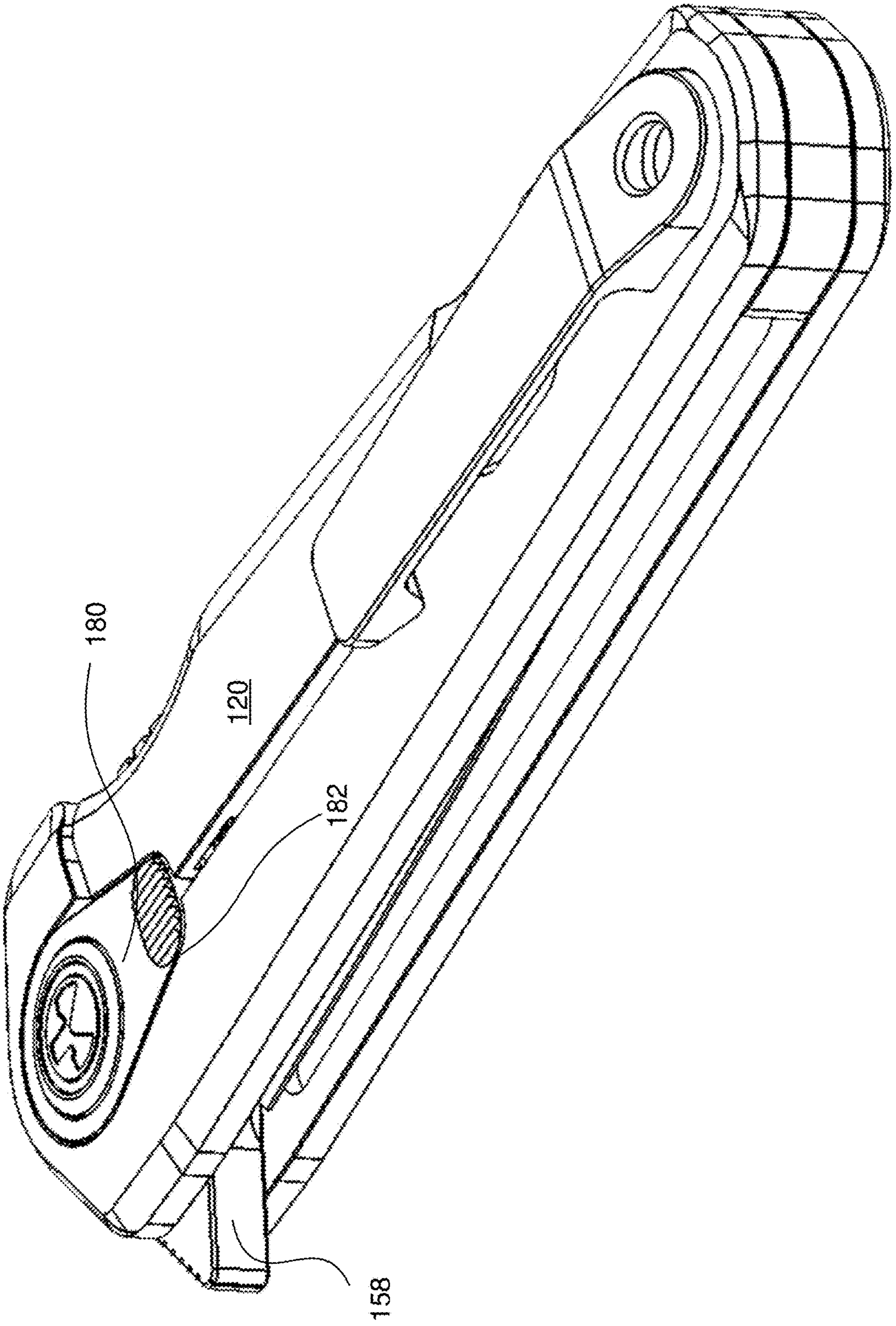
FIG. 18 shows a top rear left perspective rear view of the folding knife of FIG. 1 with the blade in the retracted position.
Figure 19:
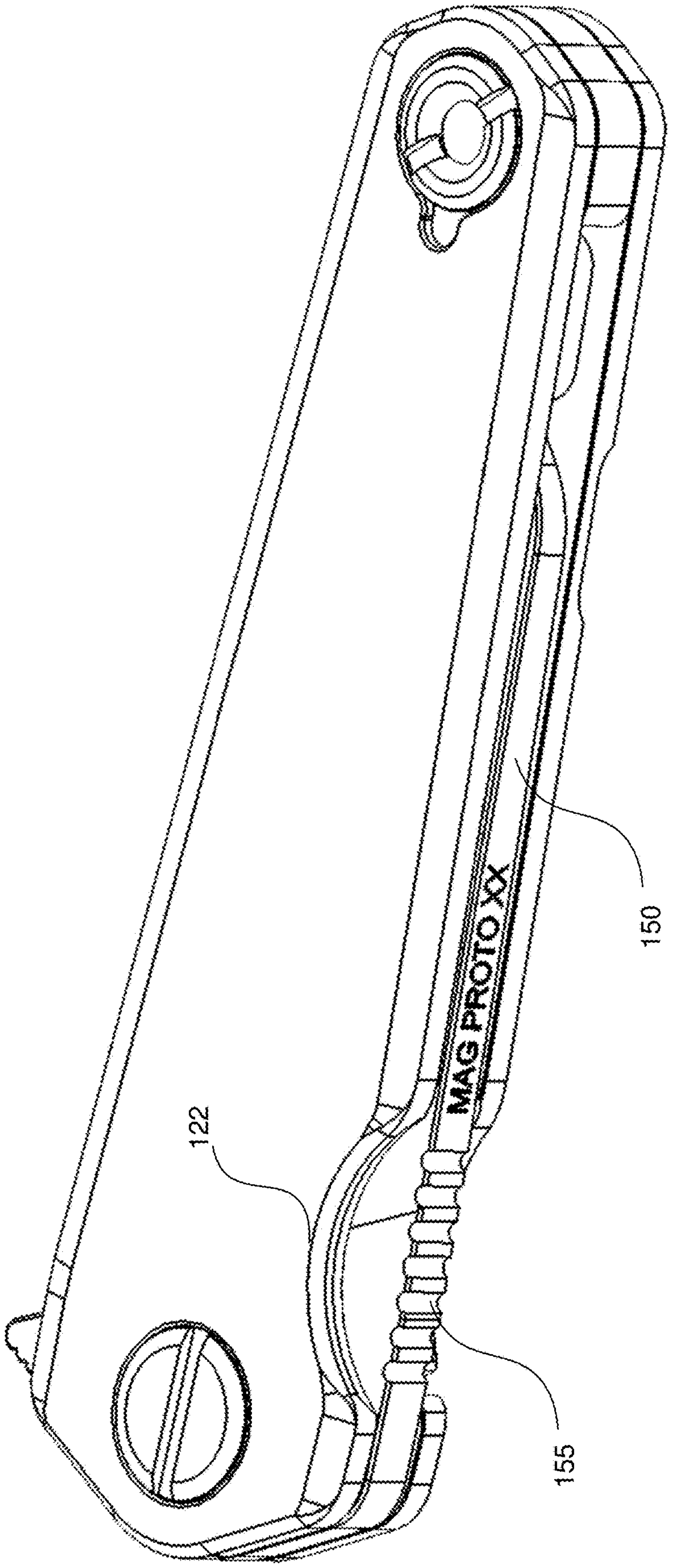
FIG. 19 shows a bottom right middle perspective front view of the folding knife of FIG. 1 with the blade in the retracted position.
Figure 20:
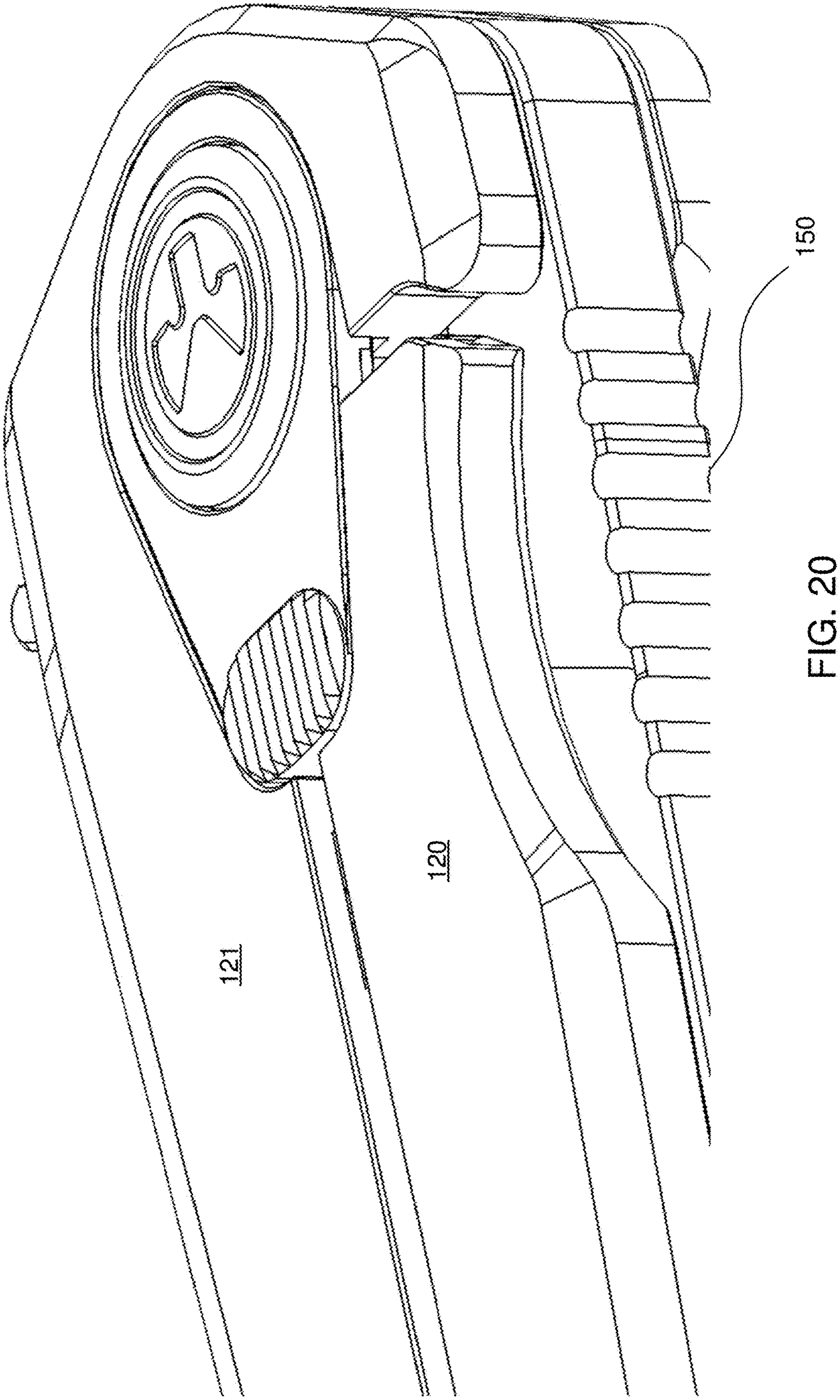
FIG. 20 shows a close-up view of the handle lock and the safety toggle switch of the folding knife of FIG. 1.

When a user wishes to extend and lock the knife, the user can use the blade flipper 158 shown in FIG. 18 to extend the blade 150. Alternatively, a user can grip the blade 150 through the handle lock cutout portion 122 shown in FIGS. 18 and 19. The blade ridges 155 (often referred to as jimping) can provide a surface for the user to push the blade 150 back into its folded position and can be used as a thumb placement for higher grip during finer cutting work. When the blade is in its folded position, the switch 180 is secured not only by the bias of its internal spring (not visible), but also by the shape formed by the handle lock 120 and the safety toggle switch cutout 182 themselves (see e.g., FIG. 20). Examples of the spring can be seen, for instance, in FIGS. 21-23.

Figure 21:
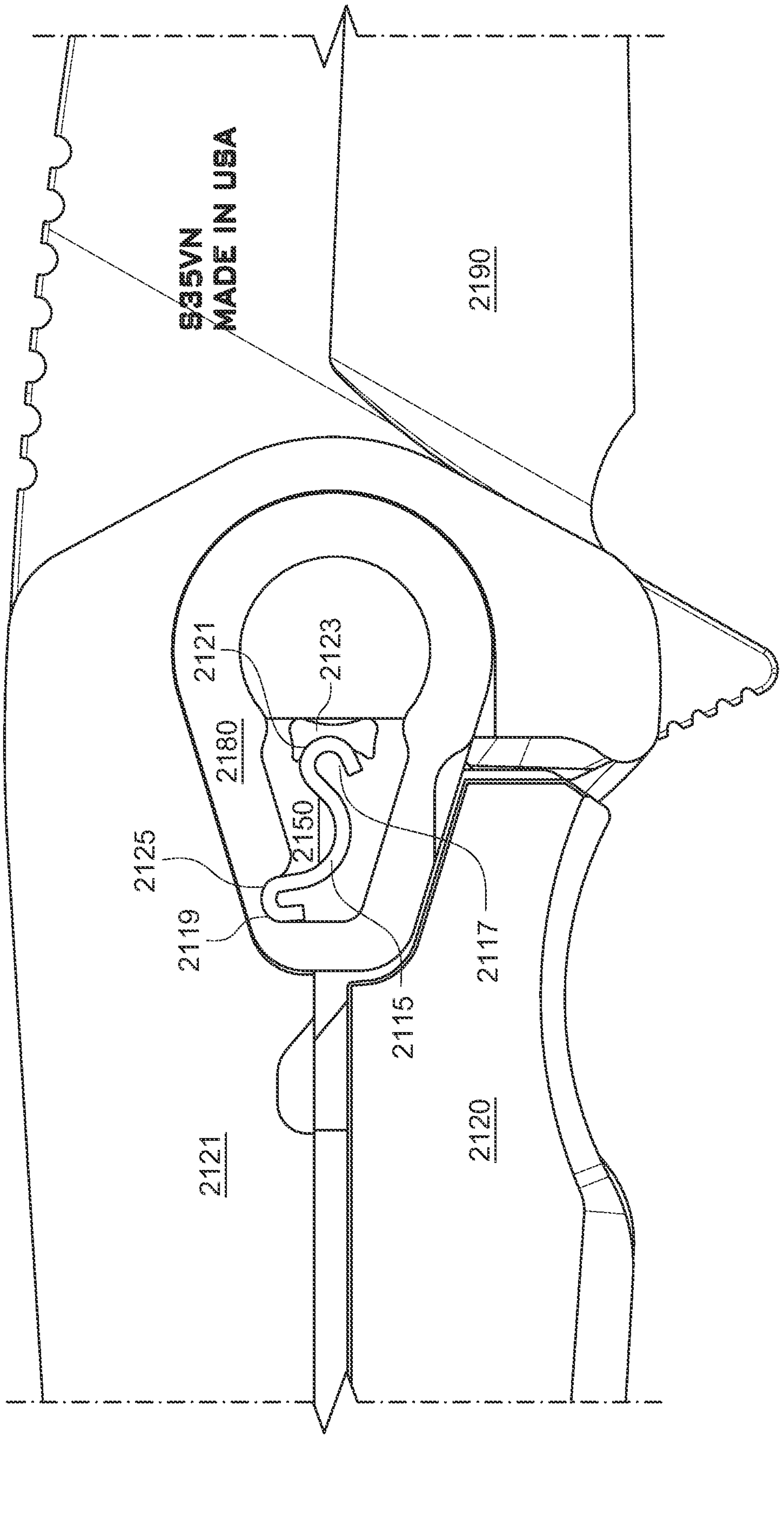
FIG. 21 shows a cross section of the folding knife showing an embodiment of a spring within the switch where the switch is in a disengaged position.
Figure 22:
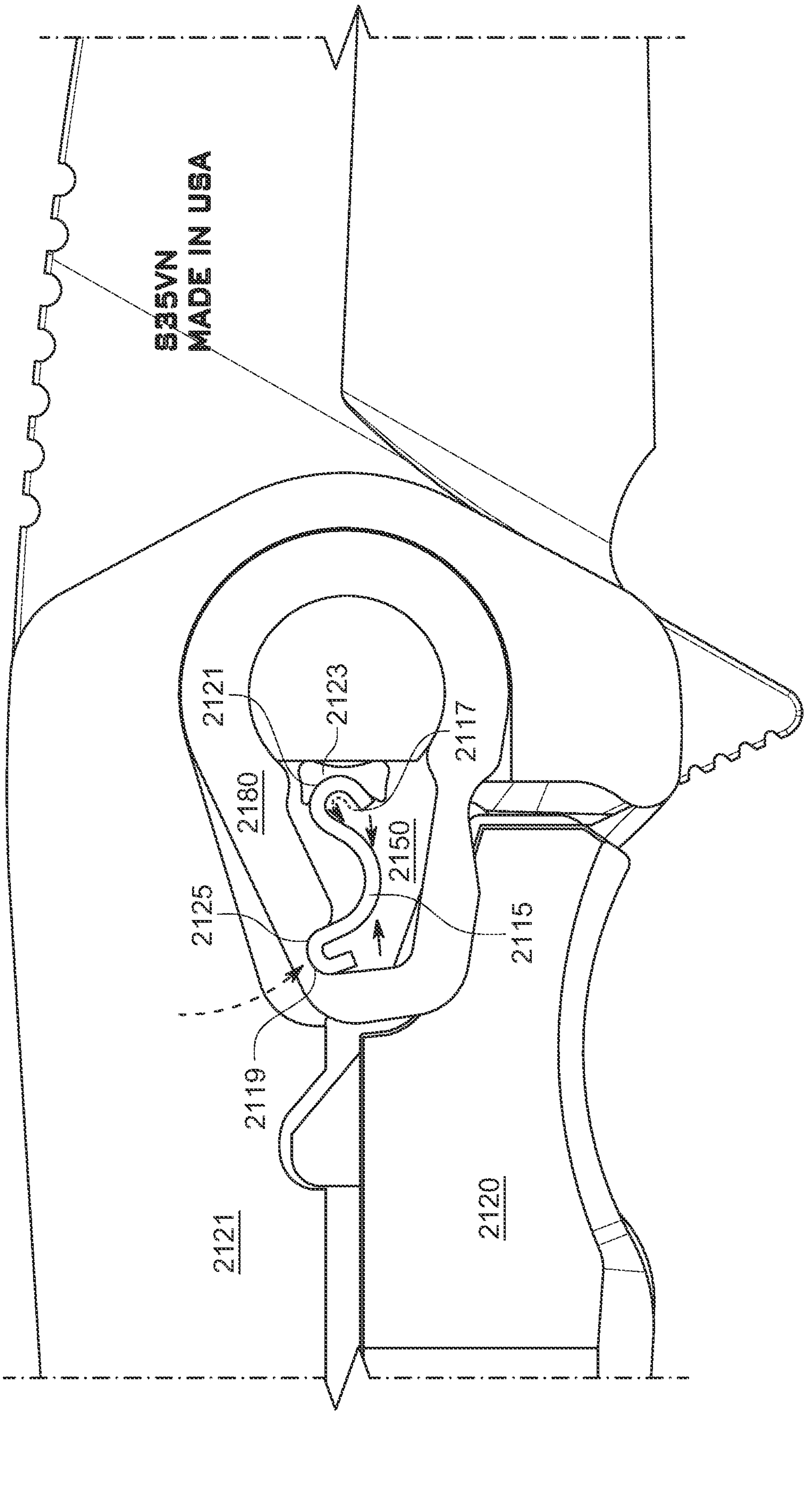
FIG. 22 shows a cross section of the folding knife showing the spring of FIG. 21 within the switch where the switch is in between an engaged and the disengaged positions.
Figure 23:
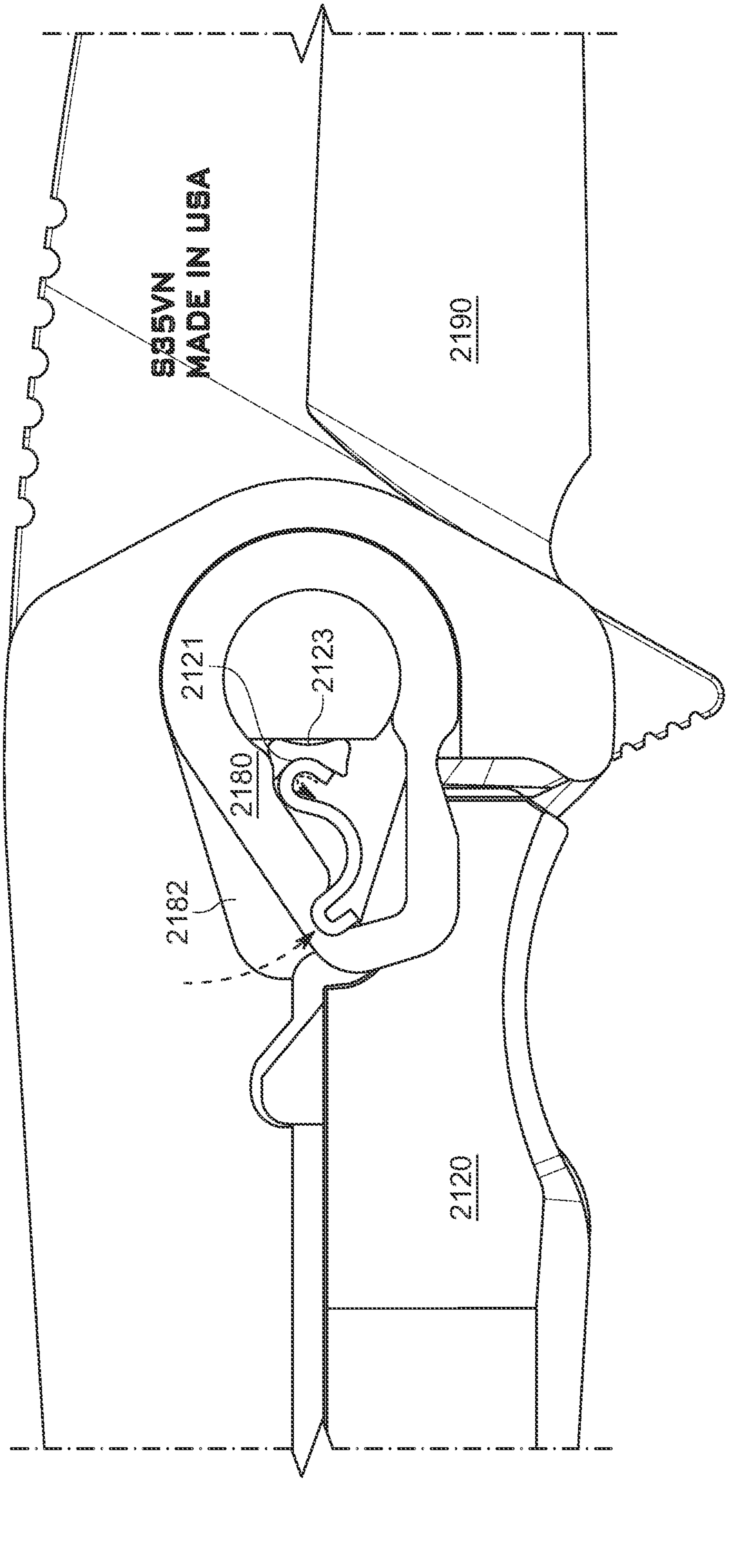
FIG. 23 shows a cross section of the folding knife showing the spring of FIG. 21 within the switch where the switch is in the engaged position.

The safety toggle switch can include a feature that causes the switch to securely rest in the engaged or disengaged position as previously described, which creates a tactile feel for the user that easily lets the user know when the switch is in its desired position. Such a feature can be a spring embedded in a pocket in the safety toggle switch, as shown in FIGS. 21-23. The spring can apply the rotational bias to the safety toggle switch that moves the switch toward an engaged or disengaged position when it is between those two positions and holds them in those positions once it reaches one of them. Though shown as a wire form spring, the spring can take various forms, such as a torsion spring, a leaf spring, a coil spring, belleville spring, etc.

FIGS. 21-23 illustrate an embodiment of a cross section of the switch, spring, and handle, to show how these components can interface to bias the switch in some embodiments. The cross section is taken through a middle of the switch 2180 such that a pocket 2150 is revealed that is otherwise not visible from a top or outside of the switch 2180. In the disengaged position (FIG. 21), the switch 2180 does not overlap the handle lock portion 2120 and thus allows the handle lock portion 2120 to be moved against its bias direction (out of the page in FIGS. 21-23) and thereby moved away from the tang of the blade 2190 such that the blade 2190 can be rotated toward a folded position (clockwise in FIGS. 21-23). In the engaged position (FIG. 23), the switch 2180 overlaps at least a portion of the handle lock portion 2120 and prevents the handle lock portion 2120 from being moved out of engagement with the tang of the blade 2190 (i.e., from moving out of the page).

The spring 2115 can be elongated and can be arranged within a pocket 2150 in the switch 2180. The pocket 2150 can be on an underside of the switch 2180 that is not exposed or visible to the user. The spring 2115 can have at least one curve therein, and in some instances a first end 2117 and a second end 2119 can also include curves, optionally curving in an opposing direction to a main curve of the spring 2115. In an embodiment, the spring 2115 can be an "Omega" shaped spring. FIGS. 21 and 23 show the spring 2115 in a more relaxed state, such that it presents a lesser bias on the switch 2180, but still sufficient bias to press the switch 2180 against sides of the switch cutout recess 2182. FIG. 22 shows the switch 2180 between the engaged and disengaged positions, such that the spring 2115 is further compressed than it is when the switch 2180 is in the engaged or disengaged positions. Accordingly, the spring 2115 also presents a greater rotational bias on the switch 2180. The direction and magnitude of the rotation bias depends on the position of the spring 2115 (see FIG. 25). In particular, at the maximum compression state, this apex of compression force represents an unstable equilibrium whereby any rotational shift will cause the switch 2180 to bias into either the engaged or disengaged position.

The spring 2115 can be a wire form spring. The first end 2117 can be proximal to a pivot axis of the switch 2180 and the second end 2119 can be distal from the pivot axis of the switch 2180. The first end 2117 can interface with a protrusion 2123 of the handle and rotate within a pocket 2121 of the protrusion 2123 as the switch 2180 rotates. The second end 2119 can nest in a sub-pocket 2125 in the protrusion 2123 of the switch 2180.

Figure 26:
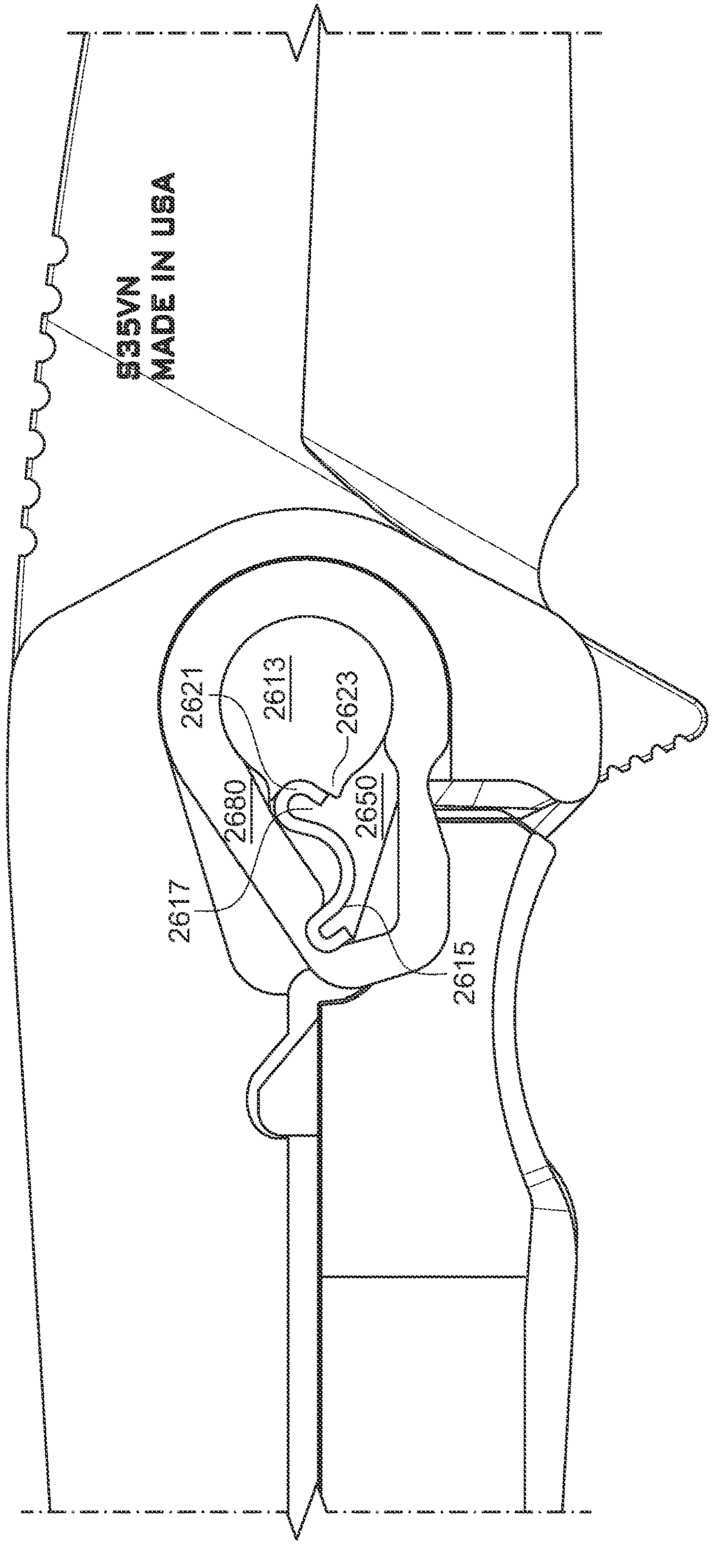
FIG. 26 shows one embodiment of a cross section of the folding knife showing the spring within the switch and a pocket of the pivot mechanism.

In an alternative embodiment, the pocket can be formed in a pivot mechanism around which the blade and the switch rotate. FIG. 26 illustrates such an embodiment. While the pivot mechanism 2613 is normally a cylindrical structure without perturbations, in this embodiment a protrusion 2623 can extend outward from the pivot mechanism 2613 into the pocket 2650 of the switch 2680. The pocket 2621 of the pivot mechanism 2613 can be curved and/or concave and shaped to receive the first end 2617 of the spring 2615.

This example illustrates that any mechanism that allows increased compression of the spring when the switch is rotated, will be suitable for the purposes of this disclosure. Thus, the locations of the ends of the spring, what they are fixed to, and whether they are fixed or rotating, are variable.

Further, as long as the first end the spring can rotate within a fixed pocket, it does not matter whether the pocket is part of the handle, the pivot mechanism, or some other structure on the folding knife.

If the user applies a torque to the switch 2180, then this causes the switch 2180 to rotate, which in turn increases compression of the spring 2115 creating resistance to the user's attempt to rotate the switch 2180. However, after a certain amount of rotation of the switch 2180, and a maximum compression of the spring 2115, the spring 2115 begins to decompress and at this point it begins generating a torque or bias in the opposing direction—toward the engaged position of the switch 2180 (see plot of rotational bias as a function of switch position in FIG. 25). In the engaged position, at least a portion of the switch 2180 overlaps a portion of the handle lock 2120, thereby preventing the handle lock 2120 from moving out of engagement with the tang of the blade 2190.

Figure 24:
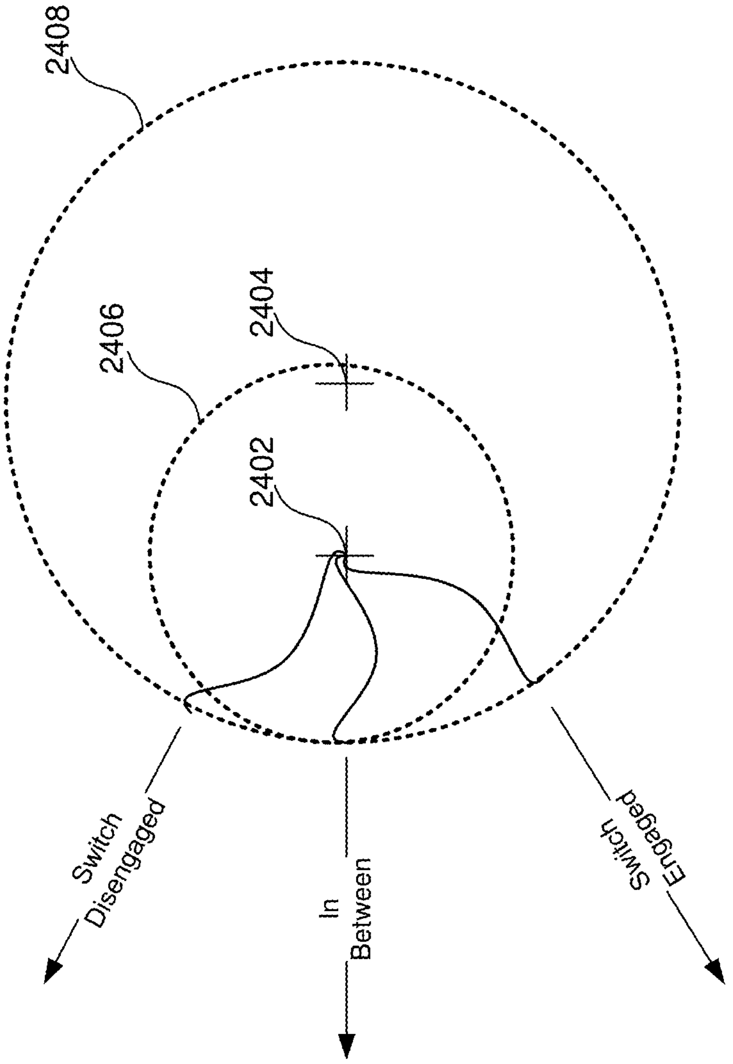
FIG. 24 shows an exaggerated illustration of the spring of any of the herein-described embodiments in three different positions along with curved paths traced by rotation of the switch and rotation of the second end of the spring.

FIG. 24 illustrates an exaggerated view of the spring 2115 in three different positions along with corresponding radii of curvature for the switch 2180 and the spring 2115. This exaggerated illustration helps show that when the switch 2180 is in the disengaged position, the spring 2115 is angled upward; in the engaged position, the spring 2115 is angled downward, and in between the disengaged and engaged positions, the spring 2115 is roughly oriented horizontally. Pivot axis 2402 is the pivot axis of the spring 2115, and pivot axis 2404 is the pivot axis of the switch 2180. The switch

2180 radius of curvature 2408 is wider than, and offset from, the radius of curvature 2406 for the spring 2115. As a result, the spring 2115 can be in a relaxed state when the switch 2180 is engaged or disengaged, and in a compressed state in between these two relaxed states since the radius of curvature 2408 of the switch 2180 moves toward the pivot axis 2402 of the spring 2115. One can also see that the spring 2115 is most compressed halfway between the switch's engaged and disengaged positions, and the torque or bias that it applies to the switch reverses on either side of this middle point and tapers off as the switch 2180 moves closer to the engaged or disengaged positions. These are relative positions shown for illustration only and do not necessarily correspond to a specific set of angles on the knife itself.

Figure 25:
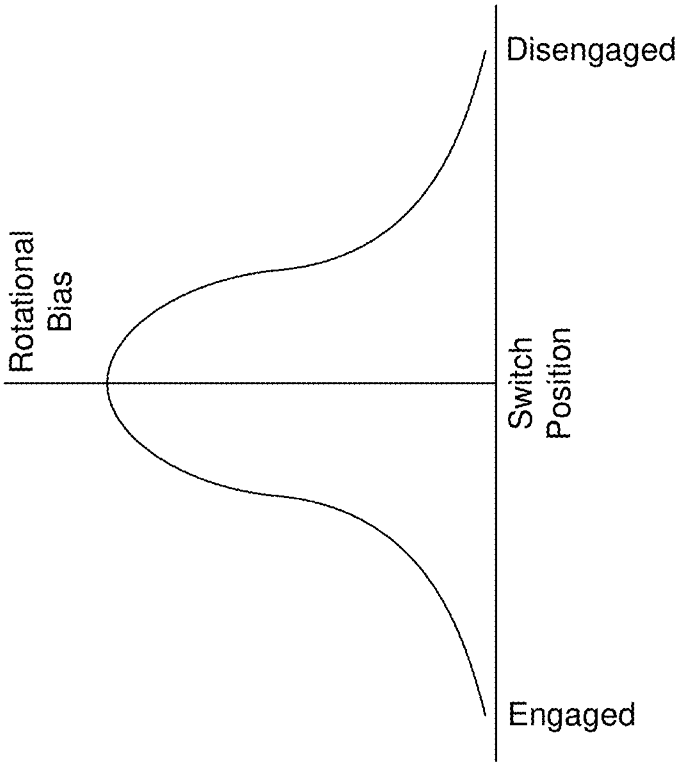
FIG. 25 shows one embodiment of a plot of rotational bias force/torque of the spring of any of the herein-described embodiments as a function of the switch's position.

FIG. 25 shows one embodiment of a plot of rotational bias force/torque of the spring as a function of the switch's position. At either extreme, the spring applies a small rotational bias on the switch pressing the switch against a side of the switch cutout recess. As the switch is rotated toward an opposing side of the switch cutout recess, a contrariwise rotational bias gradually increases until an apex is reached at a point bisecting the engaged and disengaged positions. Once the switch moves past this center position, the bias reverses and the spring begins to bias the switch toward the opposing position. One will appreciate that the bell-style force curve that is illustrated is just one force curve that could result from the various parameters of the spring and switch pivot axes, radii of curvature, etc.

Although this disclosure has generally referred to a handle lock that is part of a frame or handle of a locking folding knife, in some embodiments, the locking portion can be part of a liner that is coupled to a handle or frame. Such a locking mechanism can be referred to as a liner lock and would operate in a similar fashion to the handle lock described throughout this disclosure. In particular, FIGS. 27-34 show various views of an embodiment where the locking portion is part of a liner that is coupled to a handle or frame. The liner lock embodiment works much like the handle lock variation described earlier. Here the liner lock 2720 is biased toward an opposing side of the folding knife 2700. The liner lock 2720 engages with a back end 2760 of the blade tang 2760. When the blade tang is in its fully folded position, the liner lock 2720 is flush with the rest of the liner because the physical volume of the blade 2790 pushes the handle lock 2720 out, against its natural bias and into the same plane as a non-movable portion 2721 of the liner. The folding knife 2700 includes a safety toggle switch 2780. When the blade 2790 is in its fully extended position and the liner lock 2720 (or flexible portion) is engaged with a tang of the blade 2790, the safety toggle switch 2780, which can rotate within a switch cutout recess 2782 (e.g., by around 15° or around 30° or around 45°) in a handle 2760, is situated in an engaged position within the switch cutout recess 2782.

The liner 2720 can be unitary with a non-movable portion 2721 and separated therefrom by a slit 2725, where the liner lock 2720 can include a hollow 3023 (see FIG. 30) that enhances its ability to flex relative to the non-movable portion 2721. In the engaged position, the safety toggle switch 2780 is positioned over at least a portion of the liner lock 2720, preventing the liner lock 2720 from being moved out of its locked position. This safety toggle switch 2780 therefore prevents any accidental disengagement of the liner lock 2720 that may occur if upward pressure were to be inadvertently applied against the bias of the liner lock 2720. Further, the safety toggle switch 2780 prevents the liner lock 2720 from moving if the bias tension is diminished from wear or metal fatigue over time. When the blade 2790 is in its folded position, the switch 2780 is secured not only by the bias of its internal spring (not visible), but also by the shape formed by the liner lock 2720 and the safety toggle switch cutout 2782 themselves.

In the disengaged position the switch 2780 does not overlap the liner lock 2720 and thus allows the handle lock portion 2720 to be moved against its bias direction and thereby moved away from the tang of the blade 2790 such that the blade 2790 can be rotated toward a folded position. In the engaged position, the switch 2780 overlaps at least a portion of the liner lock 2720 and prevents the liner lock 2720 from being moved out of engagement with the tang 2760 of the blade 2790.

Figure 31A:
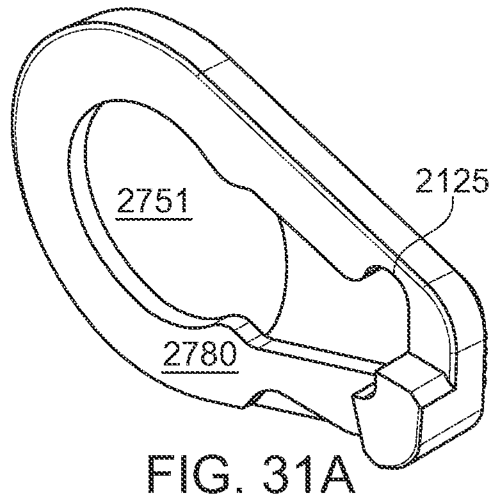
FIG. 31A shows a perspective view of the switch in FIG. 27.
Figure 31B:
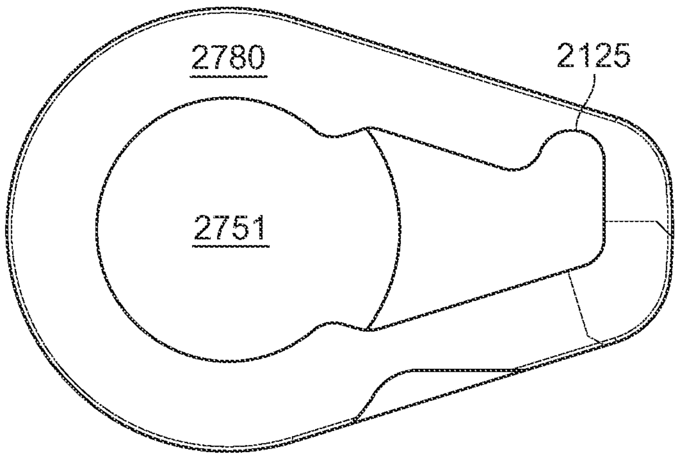
FIG. 31B shows a profile view of the switch in FIG. 31A.
Figure 31C:
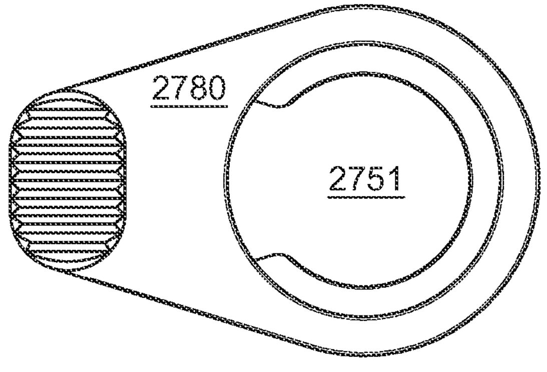
FIG. 31C shows another profile view of the switch in FIG. 31A.
Figure 32A:
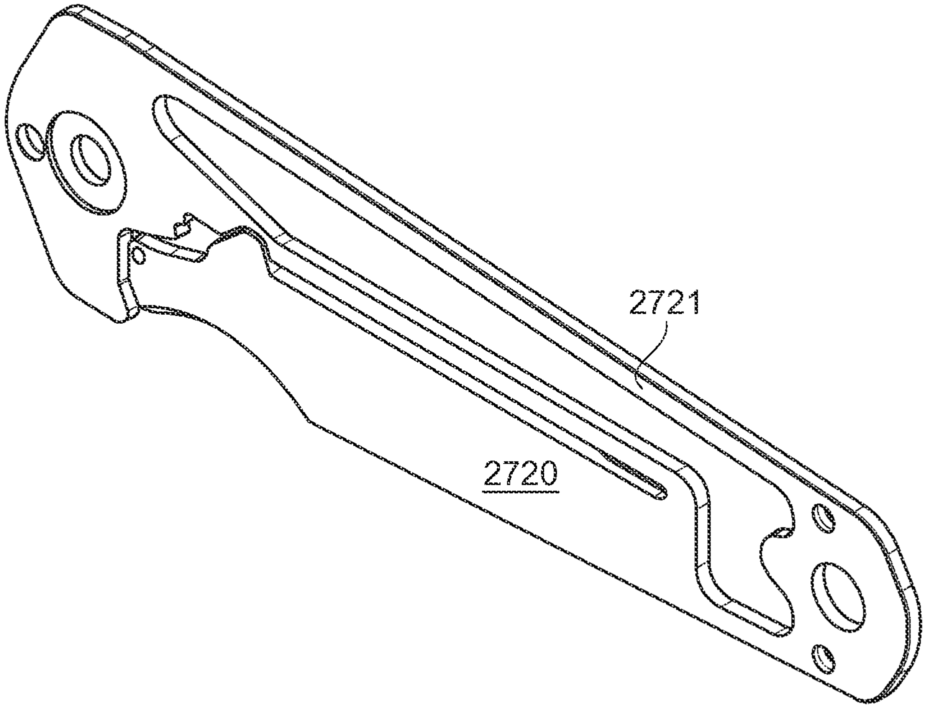
FIG. 32A shows a perspective view of a first of two liners in the embodiment shown in FIG. 27.
Figure 32B:
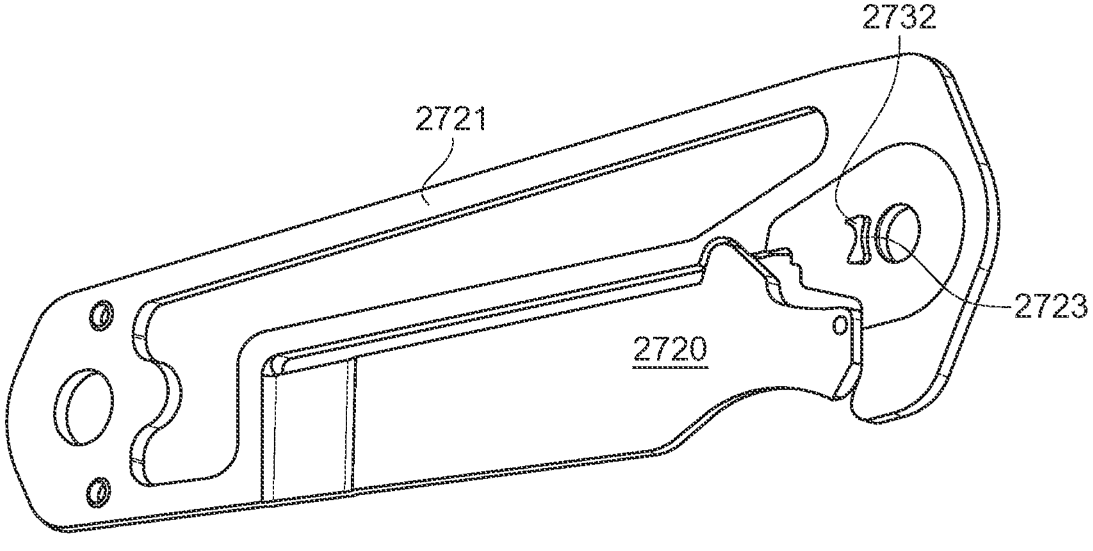
FIG. 32B shows another perspective view of the first of two liners in the embodiment shown in FIG. 27.
Figure 33A:
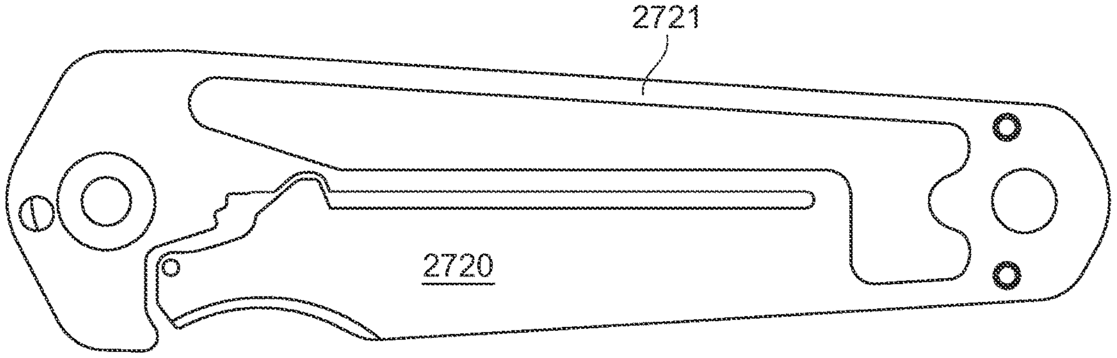
FIG. 33A shows a perspective view of the liner shown in FIG. 28.
Figure 33B:
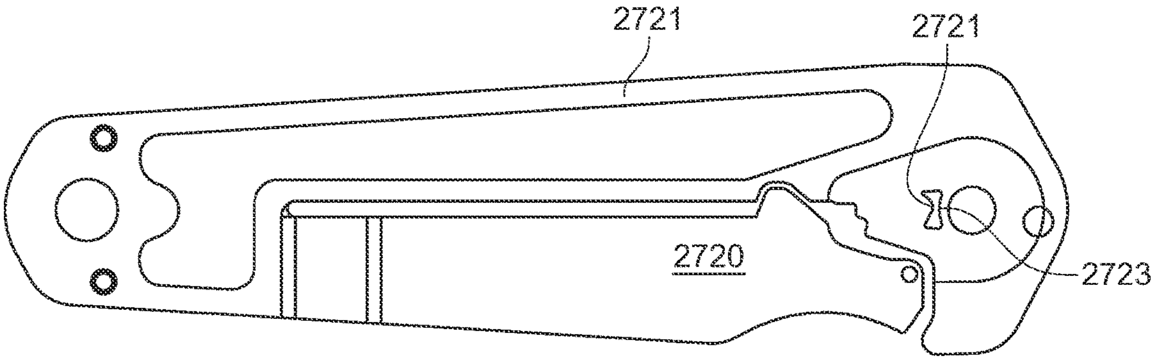
FIG. 33B shows another perspective view of the liner shown in FIG. 28

As seen in FIGS. 31A-31C, the switch 2780 can include a pocket 2751 and a sub-pocket 2125. The sub-pocket 2125 may be similar or substantially similar to the sub-pocket 2125 in FIGS. 21 and 22. The liner can include a protrusion 2723 and a pocket 2732 in the protrusion 2723. The protrusion 2723 can extend inward from the liner shown in FIGS. 32A-B and 33A-B and extend into the pocket 2751 in the switch 2780.

Figure 27:
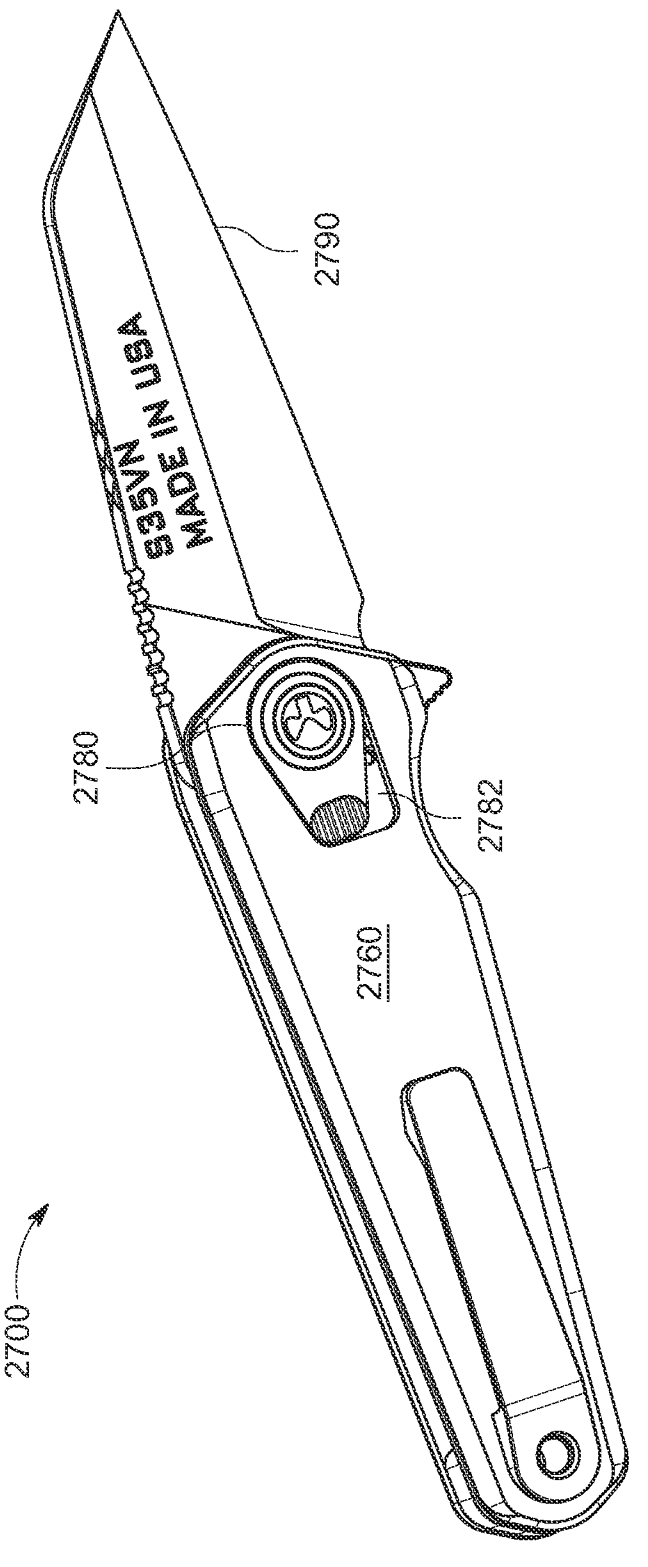
FIG. 27 shows one embodiment of a folding knife with a liner lock.
Figure 28:
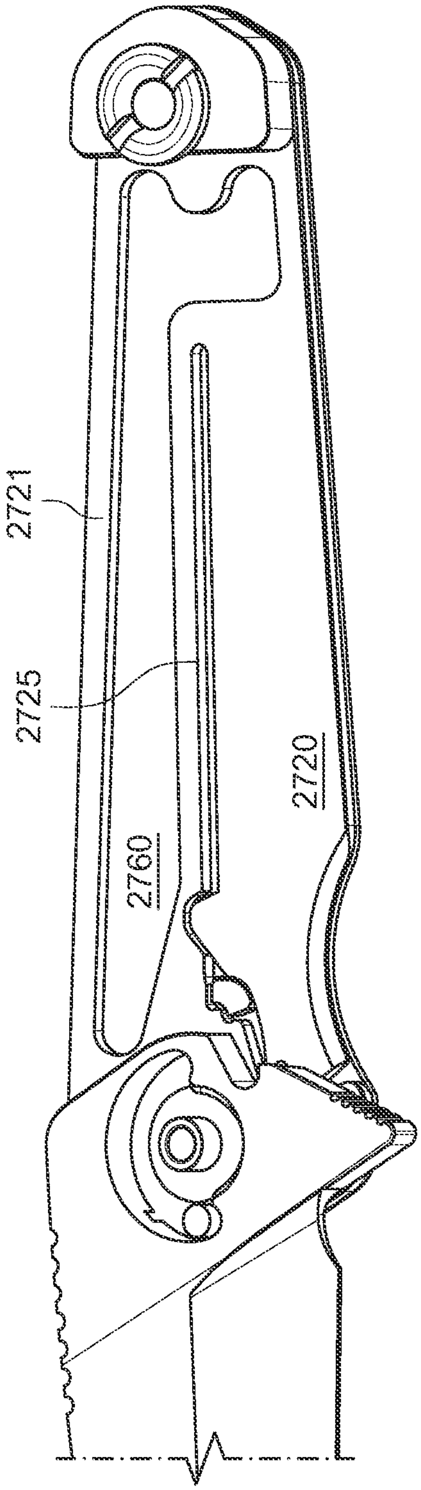
FIG. 28 shows inner details of the embodiment shown in FIG. 27 with some portions of the handle and liner hidden.
Figure 29:
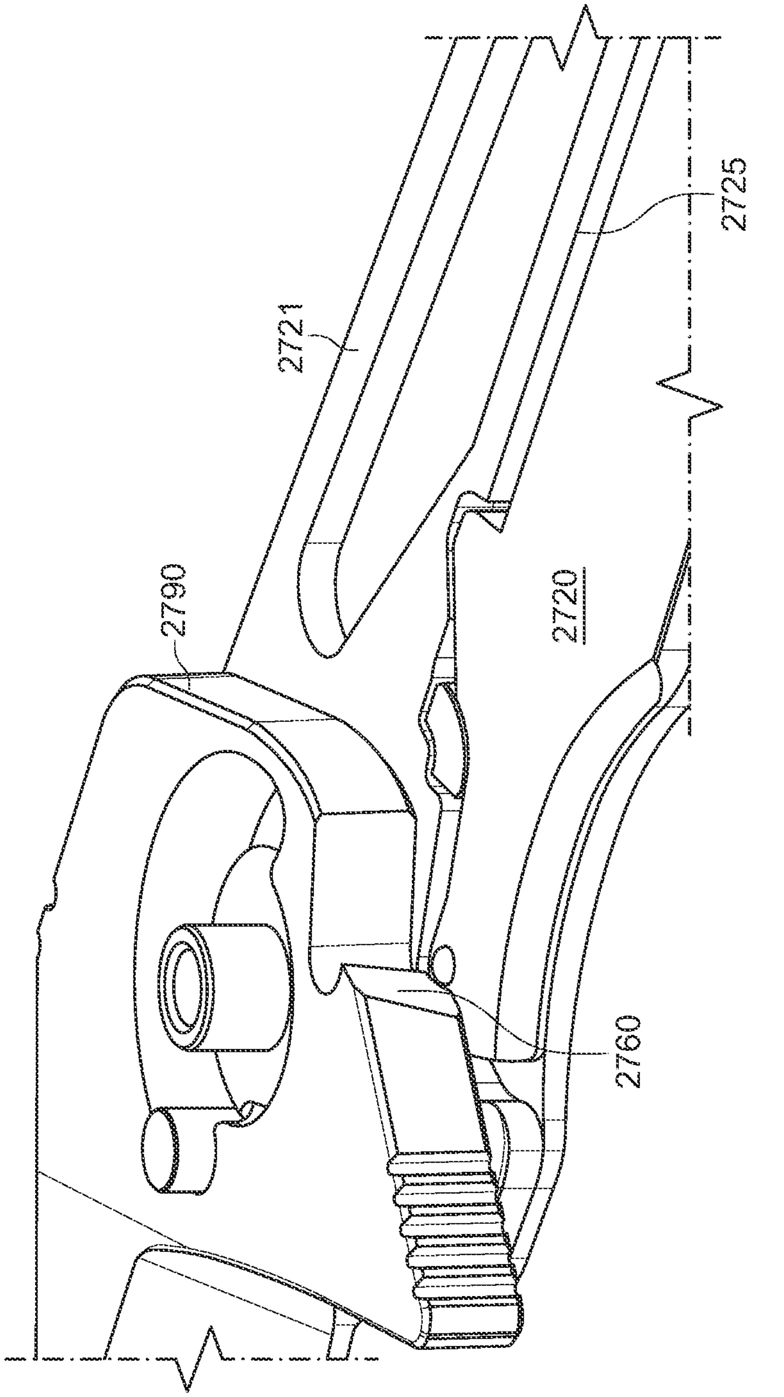
FIG. 29 shows a more detailed view of FIG. 28.
Figure 30:
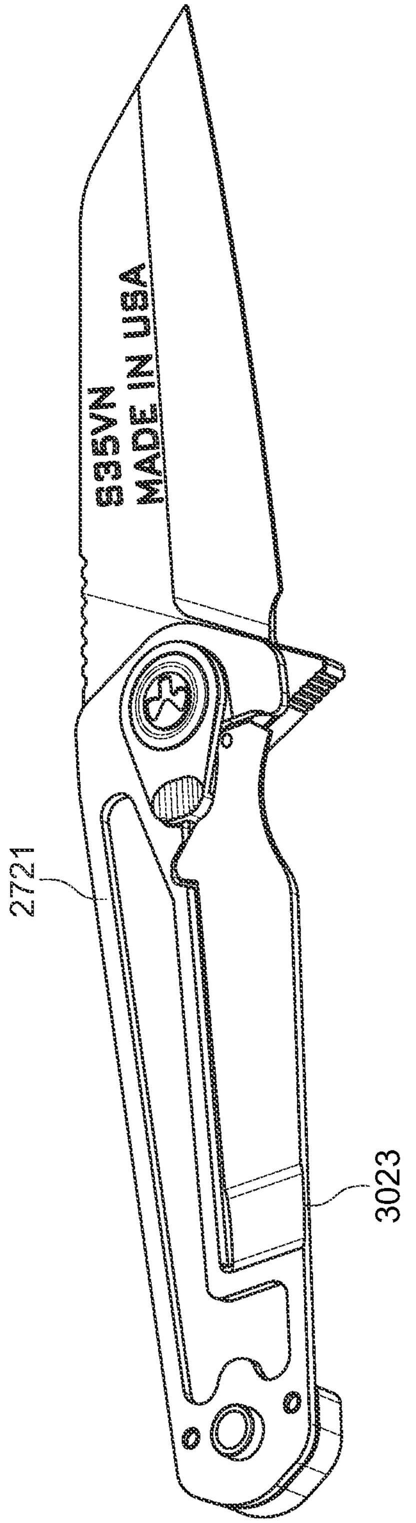
FIG. 30 shows another perspective view of FIG. 28.
Figure 34A:
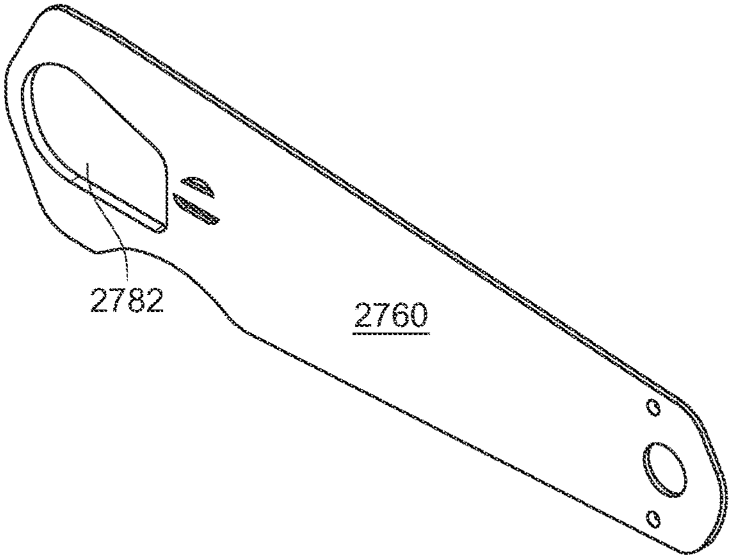
FIG. 34A shows a perspective view of the handle shown in FIG. 28.
Figure 34B:
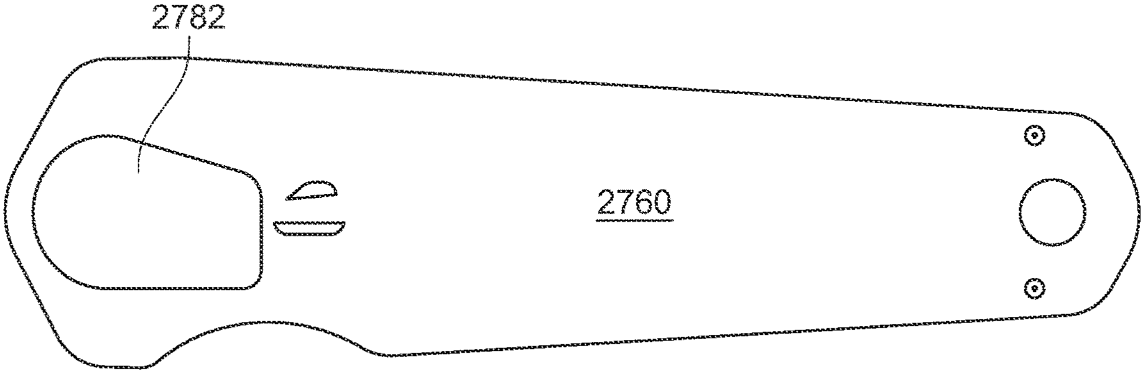
FIG. 34B shows a profile view of the handle shown in FIG. 28.
Figure 34C:
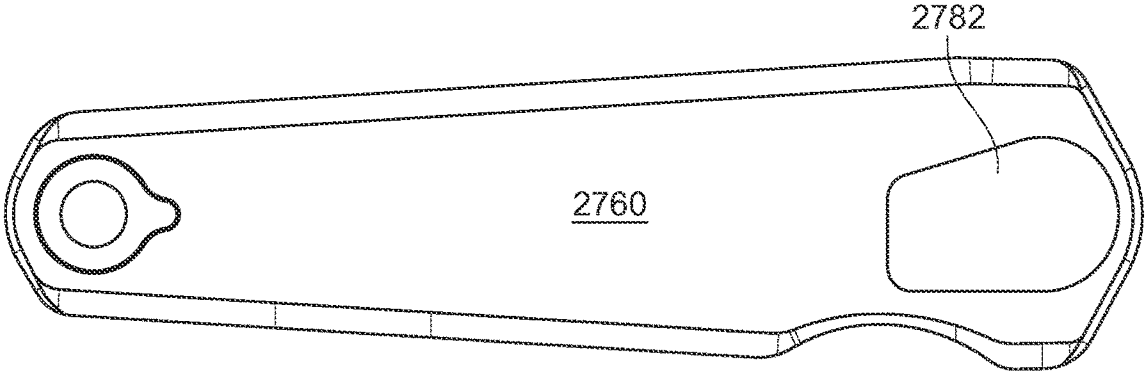
FIG. 34C shows another profile view of the handle shown in FIG. 28

FIGS. 34A-C shows three different views of the handle 2760 shown in FIGS. 27 and 28.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A locking folding knife comprising:

a handle;

a first pivot axis;

a blade having a cutting edge and a tang, the blade is pivotably coupled to the handle such that the blade is pivotable relative to the handle about the first pivot axis between a retracted position and an extended position, the cutting edge is exposed in the extended position and a portion of the blade is received within the handle in the retracted position;

a locking mechanism comprising a lock in the handle, or in a liner, and the lock being biased to a locked position, wherein the locked position prevents the blade from rotating towards the retracted position;

a switch located in a switch cutout recess in the handle or liner, wherein the switch is operable to move between an engaged position and a disengaged position, wherein when the switch is in the engaged position, the switch blocks movement of the lock from the locked position, and wherein when the switch is in the disengaged position, the lock is free to move from the locked position; and a spring having two ends, a first curved end arranged within a pocket of the handle, and a second end arranged within an internal sub-pocket of the switch, wherein the second end is curved, and wherein the sub-pocket is surrounded by the switch.

2. The locking folding knife of claim 1, wherein the spring compresses relative to the first end of the spring and the second end of the spring when the switch is rotated between the engaged and disengaged positions.

3. The locking folding knife of claim 2, wherein compression of the spring generates a rotational bias on the switch, and wherein the switch is operable to pivot about the first pivot axis between the engaged and disengaged position.

4. The locking folding knife of claim 3, wherein the spring comprises a second pivot axis, wherein the compression of the spring increases as the switch is rotated away from the engaged and disengaged positions until a midpoint in rotation is reached, and wherein a radius of curvature for the switch moves towards the second pivot axis when the switch is rotated away from the engaged and disengaged positions.

5. The locking folding knife of claim 4, wherein a torque or bias applied by the spring reverses on either side of the midpoint in rotation.

6. The locking folding knife of claim 1, wherein the first end of the spring is proximal the first pivot axis and the second end of the spring is distal from the first pivot axis.

7. The locking folding knife of claim 6, wherein the first end of the spring interfaces with a protrusion of the handle and rotates within a pocket of the protrusion as the switch rotates, and wherein the second end of the spring interfaces with the sub-pocket in the switch.

8. The locking folding knife of claim 1, wherein the liner includes a protrusion and a pocket in the protrusion, the protrusion extending inward from the liner and into a pocket in the switch.

9. The locking folding knife of claim 1, wherein the switch is one of: surrounded on at least two sides by the switch cutout recess and on a third side by the lock in the handle or surrounded on all sides by the switch cutout recess in the liner.

10. A locking folding knife comprising:

a blade;

a frame having a first side being split into a fixed portion and a lock configured to be movable between a locked and an unlocked position, wherein the locked position prevents the blade from rotating toward a closed position;

a rotatable switch mounted in a recess of the frame of the locking folding knife and rotatable around a pivot axis, the rotatable switch having an engaged position and a disengaged position, wherein in the engaged position the rotatable switch partially overlaps at least a portion of the lock thereby preventing the lock from moving to the unlocked position, and wherein in the disengaged position the rotatable switch is arranged to allow the lock to be moved between the locked and unlocked positions of the lock, and the rotatable switch in the disengaged position is surrounded by one or more of the recess in the frame and the lock in the unlocked position; and a spring arranged within the recess and surrounded by the rotatable switch.

11. The locking folding knife of claim 10, wherein the lock is a handle lock or a liner lock.

12. The locking folding knife of claim 10, wherein the spring has a first end and a second end, wherein the first end interfaces with a protrusion of the frame and rotates within a pocket of the protrusion as the rotatable switch rotates, and wherein the second end interfaces with a sub-pocket of the rotatable switch.

13. The locking folding knife of claim 10, further comprises a liner, wherein the liner includes a protrusion and a pocket in the protrusion, the protrusion extending inward from the liner and into a pocket in the rotatable switch, and wherein the first end of the spring interfaces with the pocket in the protrusion, and wherein the second end interfaces with a sub-pocket of the rotatable switch.

14. A method of manufacturing a lockable folding knife, the method comprising:

forming a blade;

forming a frame having a non-movable portion and a flexible portion movable between locked and unlocked positions, and a switch cutout recess;

rotatably affixing the blade to the frame at a pivot axis of the lockable folding knife;

forming a rotatable switch;

mounting the rotatable switch in the switch cutout recess, the rotatable switch rotatable at the pivot axis, the rotatable switch having an engaged and a disengaged position, wherein in the engaged position the rotatable switch partially overlaps at least a portion of the flexible portion thereby preventing the flexible portion from moving to the unlocked position of the flexible portion, and wherein in the disengaged position the rotatable switch is arranged to allow the flexible portion to be moved between the locked and unlocked positions; and forming a spring and mounting it within the switch cutout recess.

15. The method of claim 14, further comprising mounting at least a portion of the spring within a pocket of the rotatable switch.

16. The method of claim 15, wherein the spring comprises a spring pivot axis, wherein compression of the spring increases as the rotatable switch is rotated away from the engaged and disengaged positions until a midpoint in rotation of the rotatable switch is reached, and wherein a radius of curvature of the rotatable switch moves towards the spring pivot axis when the rotatable switch is rotated away from the engaged and disengaged positions.

17. The method of claim 16, further comprising forming a handle, and arranging a first end of the spring within a pocket of the handle and arranging a second end of the spring within a sub-pocket of the rotatable switch.

18. The method of claim 15, further comprising arranging a first end of the spring within a pocket of the flexible portion and arranging a second end of the spring within a sub-pocket of the rotatable switch.

19. The method of claim 14, wherein compression of the spring increases as the rotatable switch is rotated away from the engaged and disengaged positions until a midpoint in rotation is reached.

20. The method of claim 14, further comprising forming a spring having a first end and a second end, the first end proximal the pivot axis and the second end distal from the pivot axis, and mounting the spring primarily within the rotatable switch, wherein the spring generates a rotational bias on the rotatable switch.

* * * * *